(12) United States Patent
Abdelghaffar et al.

(10) Patent No.: US 12,408,180 B2
(45) Date of Patent: Sep. 2, 2025

(54) TECHNIQUES FOR HYBRID AUTOMATIC REPEAT REQUEST DEFERRAL IN FULL-DUPLEX

(71) Applicant: QUALCOMM Incorporated, San Diego, CA (US)

(72) Inventors: Muhammad Sayed Khairy Abdelghaffar, San Jose, CA (US); Abdelrahman Mohamed Ahmed Mohamed Ibrahim, San Diego, CA (US); Yi Huang, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 416 days.

(21) Appl. No.: 18/170,160

(22) Filed: Feb. 16, 2023

(65) Prior Publication Data
US 2024/0284465 A1 Aug. 22, 2024

(51) Int. Cl.
*H04W 72/23* (2023.01)
*H04L 5/14* (2006.01)
*H04W 72/0446* (2023.01)
*H04W 72/563* (2023.01)

(52) U.S. Cl.
CPC ............. *H04W 72/23* (2023.01); *H04L 5/14* (2013.01); *H04W 72/0446* (2013.01); *H04W 72/563* (2023.01)

(58) Field of Classification Search
CPC ... H04L 1/1854; H04L 1/1896; H04L 5/0055; H04L 5/0094; H04L 5/14; H04W 72/0446; H04W 72/23; H04W 72/563

USPC .......................................................... 370/329
See application file for complete search history.

(56) References Cited

U.S. PATENT DOCUMENTS

| | | | |
|---|---|---|---|
| 2019/0173624 A1* | 6/2019 | Liu | H04W 72/0453 |
| 2020/0177323 A1* | 6/2020 | Fakoorian | H04W 72/21 |
| 2021/0377926 A1 | 12/2021 | Li et al. | |
| 2022/0103297 A1 | 3/2022 | Elshafie et al. | |

(Continued)

OTHER PUBLICATIONS

International Search Report and Written Opinion—PCT/US2024/012945—ISA/EPO—Apr. 29, 2024.

(Continued)

*Primary Examiner* — Robert J Lopata
(74) *Attorney, Agent, or Firm* — Holland & Hart LLP

(57) ABSTRACT

Methods, systems, and devices for wireless communications are described. A user equipment (UE) may receive an indication of conflict conditions for identification of conflicts between uplink feedback messages and a communication frame structure, and may receive a downlink message within a set of semi-persistent downlink resources. The downlink message may be associated with a first uplink resource for transmitting a feedback for the downlink message, where the first uplink resource is included within a subband full-duplex (SBFD) slot that includes one or more uplink subbands. The UE may then transmit the feedback message via the first uplink resource or a second uplink resource that is deferred relative to the first uplink resource based on whether feedback deferral for the downlink message is triggered in accordance with the one or more conflict conditions the second uplink resource is included within a second slot that is subsequent to the subband full-duplex slot.

30 Claims, 15 Drawing Sheets

(56) References Cited

U.S. PATENT DOCUMENTS

| | | | |
|---|---|---|---|
| 2023/0354321 A1* | 11/2023 | Chen | H04L 5/14 |
| 2024/0163870 A1* | 5/2024 | Abdelghaffar | H04W 72/1268 |
| 2024/0267919 A1* | 8/2024 | Shim | H04L 5/0044 |
| 2024/0284510 A1* | 8/2024 | Mahama | H04L 5/0012 |
| 2024/0357567 A1* | 10/2024 | Wu | H04W 72/0453 |

OTHER PUBLICATIONS

Kumagai S (NTT Docomo Inc)., et al., "Discussion on Subband Non-Overlapping Full Duplex", 3GPP TSG RAN WG1 #111, R1-2211983, 3rd Generation Partnership Project, Mobile Competence Centre, 650, Route Des Lucioles, F-06921 Sophia-Antipolis Cedex, France, vol. 3GPP RAN 1, No. Toulouse, FR, Nov. 14, 2022-Nov. 18, 2022, Nov. 7, 2022, 15 Pages, XP052222547, pp. 5-8.

* cited by examiner

TECHNIQUES FOR HYBRID AUTOMATIC REPEAT REQUEST DEFERRAL IN FULL-DUPLEX

TECHNICAL FIELD

The following relates to wireless communications, including techniques for hybrid automatic repeat request (HARQ) deferral in full-duplex.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless devices (e.g., UEs) may include "half-duplex" devices that are able to perform communications in one direction at any one time (e.g., transmit uplink messages, or receive downlink messages at any given time). Comparatively, some newer devices may include "full-duplex" devices that are able to perform communications in multiple directions at the same time. For example, a full-duplex device may be able to transmit uplink messages and simultaneously receive downlink messages. As wireless technologies evolve, wireless networks may be made up of both half-duplex and full-duplex devices. Such a mismatch between full-duplex and half-duplex devices may result in scheduling issues within the network.

SUMMARY

The described techniques relate to improved methods, systems, devices, and apparatuses that support techniques for hybrid automatic repeat request (HARQ) deferral in full-duplex. Generally, aspects of the present disclosure are directed to techniques used to determine conflicts between uplink resources (e.g., physical uplink shared channel (PUCCH) resources) and resources of a subband full-duplex (SBFD) frame structure. In particular, aspects of the present disclosure are directed to signaling and configurations that enable half-duplex user equipments (UEs) to identify whether the UEs may nonetheless transmit HARQ messages within downlink slots that include uplink subbands (e.g., SBFD slots) of a SBFD frame structure. Such techniques may prevent unnecessary deferral of HARQ feedback in a SBFD-enabled network.

A method for wireless communication at a UE is described. The method may include receiving an indication of one or more conflict conditions for identification of conflicts between uplink feedback messages and a communication frame structure, receiving a downlink message within a set of semi-persistent downlink resources, the downlink message associated with a first uplink resource for transmitting a feedback message associated with the downlink message, the first uplink resource being included within an SBFD slot of the communication frame structure that includes one or more uplink subbands, and transmitting the feedback message associated with the downlink message via the first uplink resource or a second uplink resource that is deferred relative to the first uplink resource based on whether feedback deferral for the downlink message is triggered in accordance with the one or more conflict conditions, where the second uplink resource is included within a second slot that is subsequent to the SBFD slot.

An apparatus for wireless communication at a UE is described. The apparatus may include at least one processor, memory coupled with the at least one processor, and instructions stored in the memory. The instructions may be executable by the at least one processor (e.g., directly, indirectly, after pre-processing, or without pre-processing) to cause the UE to receive an indication of one or more conflict conditions for identification of conflicts between uplink feedback messages and a communication frame structure, receive a downlink message within a set of semi-persistent downlink resources, the downlink message associated with a first uplink resource for transmitting a feedback message associated with the downlink message, the first uplink resource being included within an SBFD slot of the communication frame structure that includes one or more uplink subbands, and transmit the feedback message associated with the downlink message via the first uplink resource or a second uplink resource that is deferred relative to the first uplink resource based on whether feedback deferral for the downlink message is triggered in accordance with the one or more conflict conditions, where the second uplink resource is included within a second slot that is subsequent to the SBFD slot.

Another apparatus for wireless communication at a UE is described. The apparatus may include means for receiving an indication of one or more conflict conditions for identification of conflicts between uplink feedback messages and a communication frame structure, means for receiving a downlink message within a set of semi-persistent downlink resources, the downlink message associated with a first uplink resource for transmitting a feedback message associated with the downlink message, the first uplink resource being included within an SBFD slot of the communication frame structure that includes one or more uplink subbands, and means for transmitting the feedback message associated with the downlink message via the first uplink resource or a second uplink resource that is deferred relative to the first uplink resource based on whether feedback deferral for the downlink message is triggered in accordance with the one or more conflict conditions, where the second uplink resource is included within a second slot that is subsequent to the SBFD slot.

A non-transitory computer-readable medium storing code for wireless communication at a UE is described. The code may include instructions executable by a processor to receive an indication of one or more conflict conditions for identification of conflicts between uplink feedback messages and a communication frame structure, receive a downlink message within a set of semi-persistent downlink resources, the downlink message associated with a first uplink resource for transmitting a feedback message associated with the downlink message, the first uplink resource being included within an SBFD slot of the communication frame structure that includes one or more uplink subbands, and transmit the feedback message associated with the downlink message via the first uplink resource or a second uplink resource that is deferred relative to the first uplink resource based on whether feedback deferral for the downlink message is triggered in accordance with the one or more conflict conditions, where the second uplink resource is included within a second slot that is subsequent to the SBFD slot.

In some examples of the method, apparatuses, and non-transitory computer-readable medium described herein, transmitting the feedback message may include operations, features, means, or instructions for transmitting the feedback message via the first uplink resource based on the first uplink resource being included within the one or more uplink subbands of the SBFD slot in a frequency domain.

In some examples of the method, apparatuses, and non-transitory computer-readable medium described herein, transmitting the feedback message may include operations, features, means, or instructions for transmitting the feedback message via the second uplink resource based on a portion of the first uplink resource being located outside of the one or more uplink subbands of the SBFD slot in a frequency domain.

Some examples of the method, apparatuses, and non-transitory computer-readable medium described herein may further include operations, features, means, or instructions for receiving control signaling indicating one or more candidate frequency offsets associated with the first uplink resource within the SBFD slot and transmitting the feedback message via the first uplink resource based on the first uplink resource being included within the one or more uplink subbands of the SBFD slot in a frequency domain using a frequency offset of the one or more candidate frequency offsets.

In some examples of the method, apparatuses, and non-transitory computer-readable medium described herein, transmitting the feedback message may include operations, features, means, or instructions for transmitting the feedback message via the second uplink resource based on the first uplink resource at least partially overlapping in a time domain with an additional resource within the SBFD slot that may be associated with a synchronization signal block (SSB), a common search space (CSS), or both.

In some examples of the method, apparatuses, and non-transitory computer-readable medium described herein, transmitting the feedback message may include operations, features, means, or instructions for transmitting the feedback message via the first uplink resource based on the first uplink resource being included within the one or more uplink subbands of the SBFD slot in a frequency domain, and despite the first uplink resource at least partially overlapping in a time domain with an additional resource within the SBFD slot that may be associated with an SSB, a CSS, or both.

Some examples of the method, apparatuses, and non-transitory computer-readable medium described herein may further include operations, features, means, or instructions for receiving control signaling indicating a first priority associated with the feedback message and a second priority associated with the SSB, the CSS, or both and determining whether feedback deferral may be triggered based on a comparison of the first priority and the second priority, where transmitting the feedback message may be based on the determining.

In some examples of the method, apparatuses, and non-transitory computer-readable medium described herein, transmitting the feedback message may include operations, features, means, or instructions for transmitting the feedback message via the second uplink resource based on a portion of the first uplink resource being located outside of the one or more uplink subbands of the SBFD slot in a frequency domain, and based on the first uplink resource at least partially overlapping in a time domain with an additional resource within the SBFD slot that may be associated with an SSB, a CSS, or both.

Some examples of the method, apparatuses, and non-transitory computer-readable medium described herein may further include operations, features, means, or instructions for receiving control signaling indicating a first set of uplink control channel resource configurations associated with half-duplex slots, and a second set of uplink control channel resource configurations associated with SBFD slots and determining whether feedback deferral may be triggered based on the first uplink resource being associated with the first set of uplink control channel resource configurations, where transmitting the feedback message may be based on the determining.

In some examples of the method, apparatuses, and non-transitory computer-readable medium described herein, transmitting the feedback message may include operations, features, means, or instructions for transmitting the feedback message via the second uplink resource and in accordance with the first set of uplink control channel resource configurations based on the second slot including a half-duplex slot, and transmitting the feedback message via the second uplink resource and in accordance with the second set of uplink control channel resource configurations based on the second slot including an SBFD slot.

Some examples of the method, apparatuses, and non-transitory computer-readable medium described herein may further include operations, features, means, or instructions for receiving an indication of a maximum deferral interval associated with deferral of feedback messages, where the second slot including the second uplink resource may be within the maximum deferral interval.

In some examples of the method, apparatuses, and non-transitory computer-readable medium described herein, transmitting the feedback message may include operations, features, means, or instructions for transmitting the feedback message via the second uplink resource based on the second slot including the second uplink resource including a first uplink slot following the SBFD slot, a first flexible slot following the SBFD slot, or an additional SBFD slot including one or more additional uplink subbands following the SBFD slot.

In some examples of the method, apparatuses, and non-transitory computer-readable medium described herein, transmitting the feedback message may include operations, features, means, or instructions for transmitting the feedback message via the second uplink resource based on the first uplink slot, the first flexible slot, or the additional SBFD slot including a threshold quantity of uplink time and frequency resources to accommodate the second uplink resource.

In some examples of the method, apparatuses, and non-transitory computer-readable medium described herein, the UE may be capable of performing half-duplex communications and the UE includes an SBFD-aware UE.

A method for wireless communication at a network entity is described. The method may include transmitting, to a UE, an indication of one or more conflict conditions for identification of conflicts between uplink feedback messages and a communication frame structure, transmitting a downlink message within a set of semi-persistent downlink resources, the downlink message associated with a first uplink resource for receiving a feedback message associated with the downlink message, the first uplink resource being included within an SBFD slot of the communication frame structure that includes one or more uplink subbands, and receiving the feedback message associated with the downlink message via the first uplink resource or a second uplink resource that is deferred relative to the first uplink resource based on whether feedback deferral for the downlink message is triggered in accordance with the one or more conflict conditions, where the second uplink resource is included within a second slot that is subsequent to the SBFD slot.

An apparatus for wireless communication at a network entity is described. The apparatus may include at least one processor, memory coupled with the at least one processor, and instructions stored in the memory. The instructions may be executable by the at least one processor (e.g., directly, indirectly, after pre-processing, or without pre-processing) to cause the network entity to transmit, to a UE, an indication of one or more conflict conditions for identification of conflicts between uplink feedback messages and a communication frame structure, transmit a downlink message within a set of semi-persistent downlink resources, the downlink message associated with a first uplink resource for receiving a feedback message associated with the downlink message, the first uplink resource being included within an SBFD slot of the communication frame structure that includes one or more uplink subbands, and receive the feedback message associated with the downlink message via the first uplink resource or a second uplink resource that is deferred relative to the first uplink resource based on whether feedback deferral for the downlink message is triggered in accordance with the one or more conflict conditions, where the second uplink resource is included within a second slot that is subsequent to the SBFD slot.

Another apparatus for wireless communication at a network entity is described. The apparatus may include means for transmitting, to a UE, an indication of one or more conflict conditions for identification of conflicts between uplink feedback messages and a communication frame structure, means for transmitting a downlink message within a set of semi-persistent downlink resources, the downlink message associated with a first uplink resource for receiving a feedback message associated with the downlink message, the first uplink resource being included within an SBFD slot of the communication frame structure that includes one or more uplink subbands, and means for receiving the feedback message associated with the downlink message via the first uplink resource or a second uplink resource that is deferred relative to the first uplink resource based on whether feedback deferral for the downlink message is triggered in accordance with the one or more conflict conditions, where the second uplink resource is included within a second slot that is subsequent to the SBFD slot.

A non-transitory computer-readable medium storing code for wireless communication at a network entity is described. The code may include instructions executable by a processor to transmit, to a UE, an indication of one or more conflict conditions for identification of conflicts between uplink feedback messages and a communication frame structure, transmit a downlink message within a set of semi-persistent downlink resources, the downlink message associated with a first uplink resource for receiving a feedback message associated with the downlink message, the first uplink resource being included within an SBFD slot of the communication frame structure that includes one or more uplink subbands, and receive the feedback message associated with the downlink message via the first uplink resource or a second uplink resource that is deferred relative to the first uplink resource based on whether feedback deferral for the downlink message is triggered in accordance with the one or more conflict conditions, where the second uplink resource is included within a second slot that is subsequent to the SBFD slot.

In some examples of the method, apparatuses, and non-transitory computer-readable medium described herein, receiving the feedback message may include operations, features, means, or instructions for receiving the feedback message via the first uplink resource based on the first uplink resource being included within the one or more uplink subbands of the SBFD slot in a frequency domain.

In some examples of the method, apparatuses, and non-transitory computer-readable medium described herein, receiving the feedback message may include operations, features, means, or instructions for receiving the feedback message via the second uplink resource based on a portion of the first uplink resource being located outside of the one or more uplink subbands of the SBFD slot in a frequency domain.

Some examples of the method, apparatuses, and non-transitory computer-readable medium described herein may further include operations, features, means, or instructions for transmitting control signaling indicating one or more candidate frequency offsets associated with the first uplink resource within the SBFD slot and receiving the feedback message via the first uplink resource based on the first uplink resource being included within the one or more uplink subbands of the SBFD slot in a frequency domain using a frequency offset of the one or more candidate frequency offsets.

In some examples of the method, apparatuses, and non-transitory computer-readable medium described herein, receiving the feedback message may include operations, features, means, or instructions for receiving the feedback message via the second uplink resource based on the first uplink resource at least partially overlapping in a time domain with an additional resource within the SBFD slot that may be associated with an SSB, a CSS, or both.

In some examples of the method, apparatuses, and non-transitory computer-readable medium described herein, receiving the feedback message may include operations, features, means, or instructions for receiving the feedback message via the first uplink resource based on the first uplink resource being included within the one or more uplink subbands of the SBFD slot in a frequency domain, and despite the first uplink resource at least partially overlapping in a time domain with an additional resource within the SBFD slot that may be associated with an SSB, a CSS, or both.

Some examples of the method, apparatuses, and non-transitory computer-readable medium described herein may further include operations, features, means, or instructions for transmitting control signaling indicating a first priority associated with the feedback message and a second priority associated with the SSB, the CSS, or both and determining whether feedback deferral may be triggered based on a comparison of the first priority and the second priority, where receiving the feedback message may be based on the determining.

In some examples of the method, apparatuses, and non-transitory computer-readable medium described herein, receiving the feedback message may include operations, features, means, or instructions for receiving the feedback message via the second uplink resource based on a portion of the first uplink resource being located outside of the one or more uplink subbands of the SBFD slot in a frequency domain, and based on the first uplink resource at least partially overlapping in a time domain with an additional resource within the SBFD slot that may be associated with an SSB, a CSS, or both.

Some examples of the method, apparatuses, and non-transitory computer-readable medium described herein may further include operations, features, means, or instructions for transmitting control signaling indicating a first set of uplink control channel resource configurations associated with half-duplex slots, and a second set of uplink control channel resource configurations associated with SBFD slots and determining whether feedback deferral may be triggered based on the second uplink resource being associated with the first set of uplink control channel resource configurations, where receiving the feedback message may be based on the determining.

In some examples of the method, apparatuses, and non-transitory computer-readable medium described herein, receiving the feedback message may include operations, features, means, or instructions for receiving the feedback message via the second uplink resource and in accordance with the first set of uplink control channel resource configurations based on the second slot including a half-duplex slot, and receiving the feedback message via the second uplink resource and in accordance with the second set of uplink control channel resource configurations based on the second slot including an SBFD slot.

Some examples of the method, apparatuses, and non-transitory computer-readable medium described herein may further include operations, features, means, or instructions for transmitting an indication of a maximum deferral interval associated with deferral of feedback messages, where the second slot including the second uplink resource may be within the maximum deferral interval.

In some examples of the method, apparatuses, and non-transitory computer-readable medium described herein, receiving the feedback message may include operations, features, means, or instructions for receiving the feedback message via the second uplink resource based on the second slot including the second uplink resource including a first uplink slot following the SBFD slot, a first flexible slot following the SBFD slot, or an additional SBFD slot including one or more additional uplink subbands following the SBFD slot.

In some examples of the method, apparatuses, and non-transitory computer-readable medium described herein, receiving the feedback message may include operations, features, means, or instructions for receiving the feedback message via the second uplink resource based on the first uplink slot, the first flexible slot, or the additional SBFD slot including a threshold quantity of uplink time and frequency resources to accommodate the second uplink resource.

In some examples of the method, apparatuses, and non-transitory computer-readable medium described herein, the UE may be capable of performing half-duplex communications and the UE includes an SBFD-aware UE.

DETAILED DESCRIPTION

Figure 1:
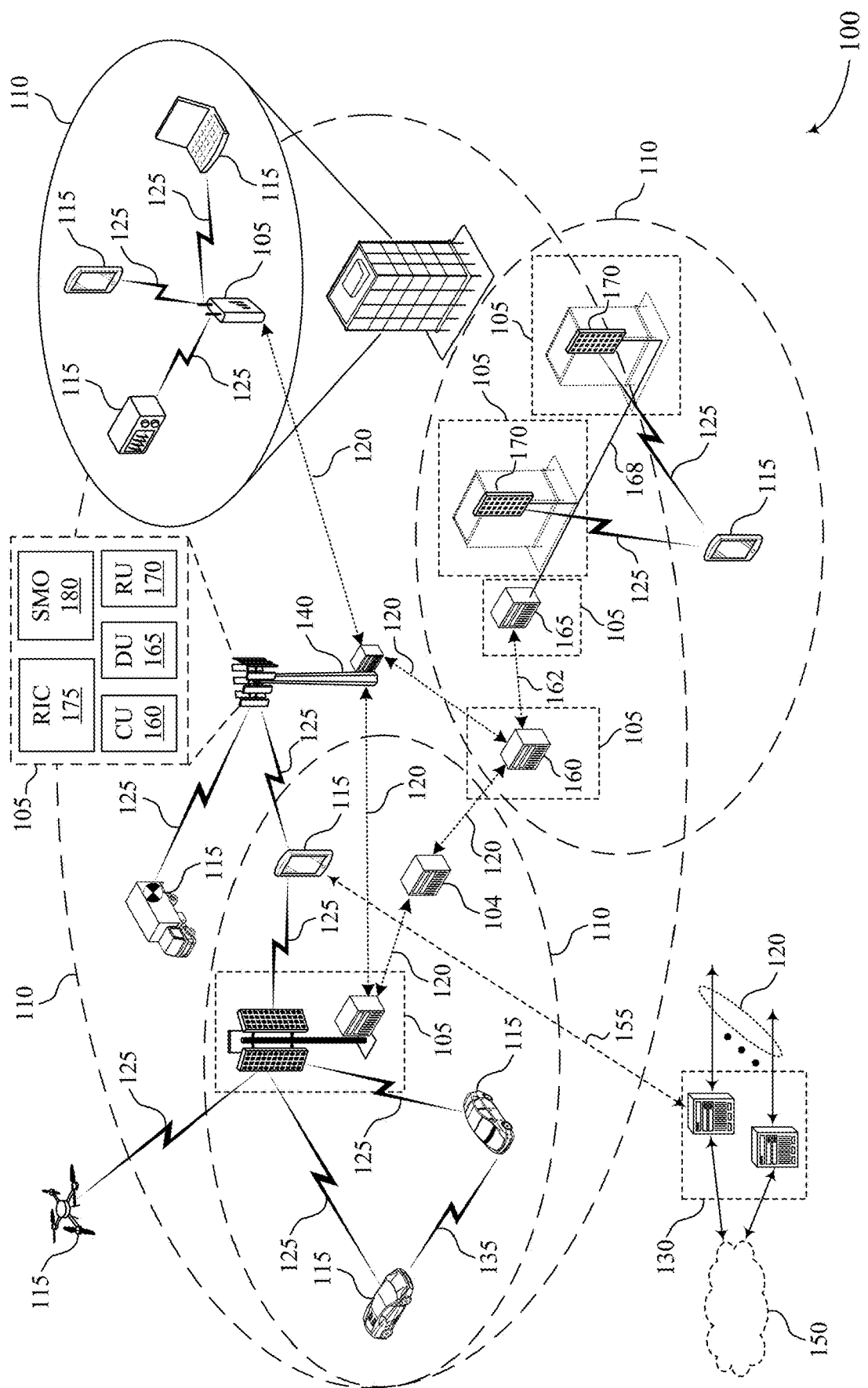
FIG. 1 illustrates an example of a wireless communications system that supports techniques for hybrid automatic repeat request (HARQ) deferral in full-duplex in accordance with one or more aspects of the present disclosure.

Some wireless devices (e.g., user equipments (UEs)) may include "half-duplex" devices that are able to perform communications in one direction at any one time (e.g., transmit uplink messages, or receive downlink messages at any given time). Comparatively, some newer devices may include "full-duplex" devices that are able to perform communications in multiple directions at the same time. For example, a full-duplex device may be able to transmit uplink messages and simultaneously receive downlink messages.

As wireless technologies evolve, wireless networks may be made up of both half-duplex and full-duplex devices. For example, network entities within a network may include full-duplex devices that communicate in accordance with full-duplex frame structures (e.g., slots that may include both uplink and downlink resources), while some UEs within the network may include half-duplex devices. Such a mismatch between full-duplex and half-duplex devices may result in scheduling issues within the network. For example, a half-duplex UE may receive a downlink message according to a semi-persistent scheduling (SPS) configuration, and may identify an uplink resource (e.g., physical uplink control channel (PUCCH) resource) for transmitting a HARQ feedback message responsive to the downlink message. In this example, the UE may identify that the uplink resource is within a downlink slot of a communication frame structure, and may therefore identify a conflict and defer the feedback message to a different resource. However, in the context of a subband full-duplex (SBFD) communication frame structure used by the network, the downlink slot may still include one or more uplink subbands that may be used to communicate the feedback message. In such cases, simply deferring the feedback message may be unnecessary, and may lead to increased latency and wasted resources.

Accordingly, aspects of the present disclosure are directed to techniques used to determine conflicts between uplink resources (e.g., PUCCH resources) and resources of an SBFD frame structure. In particular, aspects of the present disclosure are directed to signaling and configurations that enable half-duplex UEs communicating with a network entity operating in a SBFD mode to identify whether the UEs may nonetheless transmit HARQ messages within downlink slots that include uplink subbands (e.g., SBFD slots) of an SBFD frame structure. Such techniques may prevent unnecessary deferral of HARQ feedback in an SBFD-enabled network.

For example, a UE may receive messaging indicating an SPS configuration that includes conflict conditions usable by the UE and the network for determining conflicts between feedback messages and resources of an SBFD frame structure. In other words, the conflict conditions are used to determine whether or not feedback deferral for a feedback message within a downlink slot that includes uplink subbands is triggered or not. Subsequently, the UE may receive an SPS downlink message, and identify an initial uplink resource that is usable for transmitting a feedback message. The UE may then determine whether or not feedback deferral for the initial uplink resource is triggered or not (e.g., whether to use the original uplink resource, or whether to defer the HARQ feedback to a new uplink resource) based on the configured conflict conditions. For example, based on the conflict conditions, the UE may identify a conflict (which triggers feedback deferral for HARQ feedback) if the original uplink resource falls outside of the uplink subband(s) of the downlink SBFD slot, and/or if the original uplink resource overlaps with higher-priority downlink resources in the time domain.

Aspects of the disclosure are initially described in the context of wireless communications systems. Additional aspects of the disclosure are described in the context of an example resource configuration and an example process flow. Aspects of the disclosure are further illustrated by and described with reference to apparatus diagrams, system diagrams, and flowcharts that relate to techniques for HARQ deferral in full-duplex.

FIG. 1 illustrates an example of a wireless communications system 100 that supports techniques for HARQ deferral in full-duplex in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support techniques for HARQ deferral in full-duplex as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space (CSS) sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. HARQ feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The respective devices of the wireless communications system 100 may be configured to support techniques used to determine conflicts between uplink resources (e.g., PUCCH resources) and resources of an SBFD frame structure. In particular, the wireless communications system 100 may support signaling and configurations that enable half-duplex UEs 115 (e.g., SBFD-aware UEs 115) to identify whether the UEs 115 may nonetheless transmit HARQ messages within downlink slots that include uplink subbands (e.g., SBFD slots) of a SBFD frame structure. Such techniques may prevent unnecessary deferral of HARQ feedback in a SBFD-enabled network.

For example, a UE 115 of the wireless communications system 100 may receive signaling indicating an SPS configuration that includes conflict conditions usable by the UE 115 and the network for determining conflicts between feedback messages and resources of an SBFD frame structure. In other words, the conflict conditions are used to determine whether or not the UE 115 is able to transmit a feedback message within a downlink slot that includes uplink subbands. Subsequently, the UE 115 may receive an SPS downlink message, and identify an initial uplink resource that is usable for transmitting a feedback message.

The UE 115 may then determine whether feedback deferral for the initial uplink resource is triggered or not based on the configured conflict conditions. In other words, the UE 115 may determine whether to use the original uplink resource, or whether to defer the HARQ feedback to a new uplink resource, based on the configured conflict conditions. For example, based on the conflict conditions, the UE 115 may identify a conflict (which triggers feedback deferral for HARQ feedback) if the original uplink resource falls outside of the uplink subband(s) of the downlink SBFD slot, and/or if the original uplink resource overlaps with higher-priority downlink resources in the time domain.

Techniques described herein may enable UEs 115 that are capable of half-duplex communications to transmit HARQ feedback within SBFD slots. In particular, aspects of the present disclosure may enable SBFD-aware UEs 115 to identify whether conflicts exist between uplink resources (e.g., PUCCH resources) and resources of a SBFD communication frame structure in accordance with configured conflict conditions. As such, techniques described herein may enable UEs 115 to determine whether HARQ feedback may be transmitted using original uplink resources of an SBFD slot, or whether the HARQ feedback is to be deferred to a future slot. In this regard, techniques described herein may reduce unnecessary deferrals of HARQ feedback, thereby reducing a latency of wireless communications and leading to a more efficient use of wireless resources.

Figure 2:
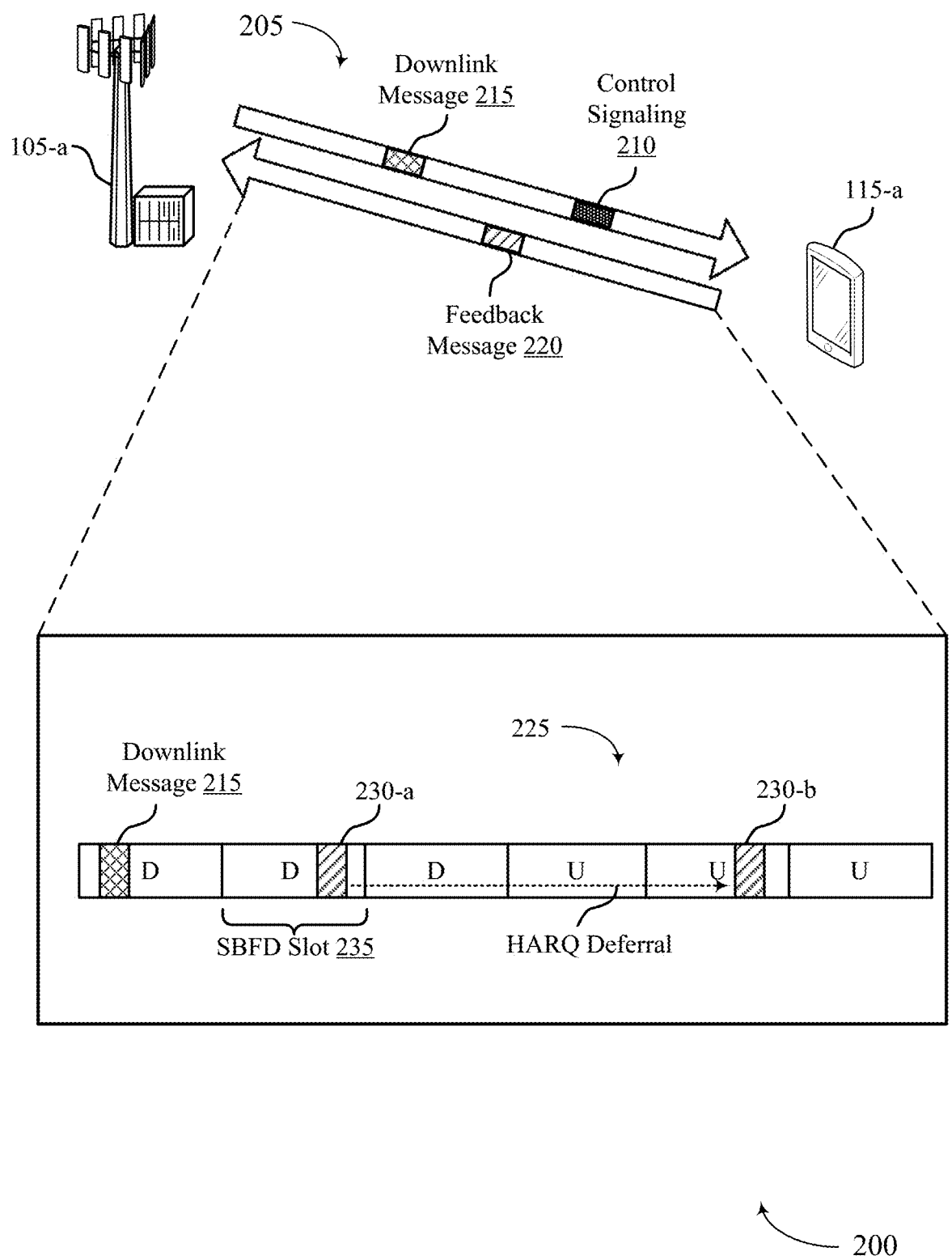
FIG. 2 illustrates an example of a wireless communications system that supports techniques for HARQ deferral in full-duplex in accordance with one or more aspects of the present disclosure.

FIG. 2 illustrates an example of a wireless communications system 200 that supports techniques for HARQ deferral in full-duplex in accordance with one or more aspects of the present disclosure. Aspects of the wireless communications system 200 may implement, or be implemented by, aspects of wireless communications system 100. For example, the wireless communications system 200 may support techniques for identifying conflicts between uplink resources (e.g., PUCCH resources) and resources of an SBFD frame structure, as described previously herein.

The wireless communications system 200 may include a UE 115-a and a network entity 105-a, which may be examples of UEs 115, network entities 105, and other wireless devices as described with reference to FIG. 1. In some aspects, the UE 115-a may communicate with the network entity 105-a via a communication link 205. In some cases, the communication link 205 may include an example of an access link (e.g., a Uu link). The communication link 205 may include a bi-directional link that can include both uplink and downlink communication. For example, the UE 115-a may transmit uplink transmissions, such as uplink control signals or uplink data signals, to the network entity 105-a using the communication link 205, and the network entity 105-a may transmit downlink transmissions, such as downlink control signals or downlink data signals, to the UE 115-a using the communication link 205.

As noted previously herein, some wireless devices (e.g., UEs 115) may include half-duplex devices that are able to perform communications in one direction at any one time (e.g., transmit uplink messages, or receive downlink messages at any given time). Comparatively, some newer devices may include full-duplex devices that are able to perform communications in multiple directions at the same time. For example, a full-duplex device may be able to transmit uplink messages and simultaneously receive downlink messages. As wireless technologies evolve, wireless networks may be made up of both half-duplex and full-duplex devices. For example, in some cases, the network entity 105-a may include a full-duplex device, and the UE 115-a may include a half-duplex device. In this regard, the network entity 105-a may be configured to communicate according to a full-duplex frame structure that includes SBFD slots with both uplink and downlink resources. In such cases, although the UE 115-a may include a half-duplex device, the UE 115-a may be labeled an "SBFD-aware UE" if the UE 115-a is "aware" of (e.g., has information about) the SBFD frame structure (e.g., SBFD-aware UE 115). In such examples, the UE 115-a may recognize and understand the SBFD frame structure, but may be limited to half-duplex communications within the SBFD frame structure.

Such a mismatch between full-duplex and half-duplex devices may result in scheduling issues within the network. In some cases, scheduling issues may arise in the context of HARQ feedback for SPS messages. For example, wireless devices (e.g., UE 115-a) may be configured (e.g., via RRC signaling) with up to SPS configurations per BWP. Each SPS configuration may include a set of semi-persistent resources for downlink messages to be communicated from the network entity 105-a to the UE 115-a, where the SPS period for each SPS configuration may be as short as one slot.

For instance, referring to the wireless communications system 200 illustrated in FIG. 2, the half-duplex UE 115 (e.g., UE 115-a) may receive a downlink message 215 according to an SPS configuration, and may identify a PUCCH resource (e.g., uplink resource 230-a) for transmitting a feedback message 220 responsive to the downlink message 215. The uplink resource 230-a for transmitting HARQ feedback may be configured relative to the downlink message 215 via the SPS configuration. In this example, the UE 115-a may identify that the uplink resource 230-a is within a downlink slot of a communication frame structure 225, and may therefore identify a conflict and defer the feedback message 220 to a different resource within the communication frame structure 225. However, in the context of an SBFD communication frame structure 225 used by the network, the downlink slot may still include one or more uplink subbands that may be used to communicate the feedback message 220. In such cases, simply deferring the feedback message 220 may be unnecessary, and may lead to increased latency and wasted resources.

Stated differently, in some wireless networks, when a PUCCH (e.g., uplink resource 230-a) for SPS HARQ-ACK (e.g., feedback message 220) overlaps with semi-static downlink symbol/slot or synchronization signal block (SSB) symbol, the UE 115-a may be configured to defer the PUCCH (e.g., feedback message 220) to a future resource that does not overlap or collide with a semi-static downlink symbol/slot or SSB symbol, as shown in FIG. 2. Such feedback mechanisms may lead to increased latency of HARQ feedback.

Accordingly, the devices of the wireless communications system 200 may support techniques used to determine conflicts between uplink resources (e.g., PUCCH resources) and resources of an SBFD communication frame structure 225. In particular, the respective devices may support signaling and configurations that enable the half-duplex UE 115-a (e.g., SBFD-aware UE 115-a) to identify whether the UE 115-a may nonetheless transmit HARQ messages within downlink slots that include uplink subbands (e.g., SBFD slots) of an SBFD communication frame structure 225. Such techniques may prevent unnecessary deferral of HARQ feedback in a SBFD-enabled network.

In particular, according to aspects of the present disclosure, SPS HARQ deferral (e.g., deferral of the feedback message 220 responsive to the downlink message 215) may be triggered when an SPS PUCCH resource (e.g., uplink resource 230-a) overlaps or otherwise collides with semi-static downlink symbols or slots, resources for SSBs, and/or resources of a control resource set (CORESET) for Type 0 PDCCH CSS. Comparatively, according to aspects of the present disclosure, SPS HARQ deferral may not be triggered when the SPS PUCCH/HARQ resource (e.g., uplink resource 230-a) collides or overlaps with flexible symbols/slots, or where the SPS HARQ feedback (e.g., feedback message 220) may be multiplexed with other PUCCH or PUSCH messages on same slot.

For example, referring to the wireless communications system the UE 115-a may receive control signaling 210 (e.g., RRC, downlink control information (DCI), MAC-CE) from the network entity 105-a, where the control signaling 210 indicates an SPS configuration for communications between the UE 115-a and the network entity 105-a. That is, the control signaling 210 may indicate an SPS configuration that includes semi-persistent downlink resources for SPS downlink messages 215 from the network entity 105-a to the UE 115-a within a communication frame structure 225 (e.g., within an SBFD communication frame structure 225). The SPS configuration may further indicate relationships between HARQ feedback responsive to the SPS downlink messages 215 (e.g., relationships for determining resources for HARQ feedback based on resources used to communicate SPS downlink messages 215).

As shown in FIG. 2, the communication frame structure 225 may include downlink slots/TTIs, uplink slots/TTIs, flexible slots/TTIs, or any combination thereof. Moreover, in some implementations, the communication frame structure may include SBFD slots/TTIs that include resources allocated for both uplink communications and downlink communications. For example, the communication frame structure 225 may include an SBFD slot 235, where the SBFD slot 235 includes resources for downlink communications and one or more subbands for uplink communications.

In some implementations, the control signaling 210 (e.g., SPS configuration) may additionally or alternatively indicate one or more conflict conditions for identifying conflicts between SPS HARQ messages (e.g., feedback messages 220 responsive to SPS downlink messages 215) and resources of the communication frame structure 225. That is, the UE 115-a may be configured with conflict conditions that define rules, thresholds, or conditions for determining whether HARQ feedback may be transmitted within an initial HARQ feedback resource (e.g., based on identification of no conflict), or whether the HARQ feedback is to be deferred to a future resource (e.g., based on identification of a conflict).

In some aspects, the control signaling 210 may indicate additional or alternative parameters associated with the SPS configuration, the communication frame structure 225, the conflict conditions, or any combination thereof. For example, the control signaling 210 may indicate candidate frequency offsets associated with uplink resources (e.g., frequency offsets associated with PUCCH/HARQ resources), priorities associated with HARQ feedback messages 220 and/or other types of messages/resources (which may be used to identify and/or resolve conflicts), uplink control channel resource configurations associated with different types of slots/TTIs, maximum deferral times for HARQ feedback (e.g., maximum amount of time that a HARQ feedback message 220 may be deferred), or any combination thereof.

In some aspects, each SPS configuration/codebook may be configured with a respective maximum deferral time (e.g., SPS HARQ deferral configured per SPS). The maximum deferral time/interval may define a maximum time after which UE 115-*a* stops trying to find the first available PUCCH resource for SPS HARQ having collided with downlink resources. In other words, the maximum deferral time indicates the maximum amount of time that a feedback message 220 may be deferred, and may be part of the SPS HARQ deferral configuration. For example, the maximum deferral time may indicate a value range for deferral, such as {0 to 31} slots or sub-slots (indicating that a feedback message may be deferred from 0 to 31 slots or sub-slots). In some aspects, Layer 1 (L1) priority may be supported for the maximum deferral time. That is, in cases where the UE 115-*a* is configured with a high-priority and low-priority SPS that are both configured for deferral and where the SPS HARQ messages collide/conflict with one another, there may be two parallel SPS HARQ deferral procedures: a first deferral procedure for the high-priority SPS HARQ, and a second deferral procedure for the low-priority SPS HARQ.

The UE 115-*a* may receive a downlink message 215 from the network entity 105-*a*. In particular, the UE 115-*a* may receive a downlink message 215 (e.g., SPS PDSCH message) within the set of semi-persistent downlink resources of the SPS configuration indicated via the control signaling 210.

In some aspects, the respective devices may identify a first (initial) uplink resource 230-*a* that may be used for transmitting a HARQ feedback message 220 responsive to the downlink message 215. The UE 115-*a* and/or the network entity 105-*a* may identify the first uplink resource 230-*a* based on receiving the control signaling 210, receiving the downlink message 215, or both. For example, the first uplink resource 230-*a* may be identified relative to the resources used to transmit/receive the downlink message 215, and based on some rule or configuration (e.g., K1 offset) defined by the SPS configuration, and the like.

Upon identifying the first uplink resource 230-*a*, the respective devices may be configured to determine whether or not feedback deferral is triggered for the feedback message 220 based on the configured conflict conditions. That is, the respective devices may be configured to utilize the conflict conditions to determine whether or not there is a conflict between the first uplink resource 230-*a* and the resources of the communication frame structure 225. In cases where no conflict exists between the first uplink resource 230-*a* and the communication frame structure (as determined by the conflict conditions), feedback deferral is not triggered, and the first uplink resource 230-*a* may be used to communicate the feedback message 220. Conversely, in cases where a conflict exists between the first uplink resource 230-*a* and the communication frame structure (as determined by the conflict conditions), feedback deferral is triggered, and the devices may identify/select a second uplink resource 230-*b* for communicating the feedback message 220.

In some cases, the respective devices may be configured to determine or identify whether a conflict exists with the first uplink resource 230-*a* (e.g., whether feedback deferral is triggered) based on the first uplink resource 230-*a* being included within an SBFD slot 235 (e.g., SBFD TTI). In other words, the respective wireless devices may be configured to evaluate whether or not there is a conflict between the first uplink resource 230-*a* and the communication frame structure 225 based on the first uplink resource 230-*a* being included within an SBFD slot 235 that includes one or more uplink subbands.

For example, in the context of half-duplex communication frame structures, if the first uplink resource 230-*a* were included within a static downlink slot, the devices may automatically identify a conflict and determine that the HARQ feedback will be deferred. However, in the context of SBFD communication frame structures (e.g., SBFD communication frame structure 225), the inclusion of the first uplink resource 230-*a* within a downlink slot may not necessarily result in a conflict, as the downlink slot may include one or more uplink subbands (e.g., SBFD slot 235) that may still be used to communicate the HARQ feedback. As such, if the devices determine that the first uplink resource 230-*a* is included within an SBFD slot 235, the respective devices may be triggered to evaluate whether or not there is a conflict (e.g., whether or not the first uplink resource 230-*a* may still be used for HARQ feedback) using the configured conflict conditions.

Various conflict conditions used for determining whether or not a conflict exists between the first uplink resource 230-*a* and the resources of the communication frame structure 225 (e.g., conflict conditions for determining whether feedback deferral is triggered) will be further shown and described with reference to FIG. 3.

In cases where the devices determine that no conflict exists between the first uplink resource 230-*a* and the resources of the communication frame structure 225, feedback deferral may not be triggered, and the UE 115-*a* may be configured to use the first uplink resource 230-*a* to transmit the feedback message 220 responsive to the downlink message 215. That is, in cases where no conflict exists, HARQ deferral may not be trigged, and the UE 115-*a* may transmit the HARQ feedback message 220 within the originally configured uplink resource.

Conversely, in cases where the devices determine that a conflict does exist between the first uplink resource 230-*a* and the resources of the communication frame structure 225, feedback deferral may be triggered, and the respective devices may identify or select a second uplink resource 230-*b* that will be used to communicate the HARQ feedback message 220. In some aspects, the devices may be configured to identify the second uplink resource 230-*b* within the next available uplink slot, flexible slot, and/or SBFD slot that includes sufficient time/frequency resources to accommodate the feedback message 220. Moreover, in some cases, the devices may be configured to identify the second uplink resource 230-*b* based on (e.g., within) a maximum deferral interval associated with deferral of HARQ feedback, which may be configured via the control signaling 210.

In some cases, the slot/TTI in which the second (deferred) uplink resource 230-*b* is identified may be referred to as a "target slot." In some aspects, multiple deferred SPS HARQ codebooks may be multiplexed onto the same "target slot." For example, the first and second resources 230-*a*, 230-*b* illustrated in FIG. 2 may be associated with a first SPS configuration (e.g., first SPS codebook), where additional HARQ feedback messages associated with other SPS configurations/codebooks may also be deferred into the same target slot as the second uplink resource 230-*b*. In some aspects, deferred SPS HARQ codebook messages (e.g., deferred feedback messages 220) may be multiplexed with a new HARQ code block and/or with a new SPS HARQ codebook within the target slot (provided that PUCCH resources within the target slot are sufficient for all HARQ codebooks/feedback messages 220). In other words, multiple feedback messages 220 associated with multiple SPS configurations (and/or dynamic grant HARQ feedback messages) may be multiplexed together within the target slot. As such, in some implementations, a deferred SPS HARQ codebook (deferred feedback message 220) may be appended to a new HARQ codebook/feedback message.

Subsequently, the UE 115-*a* may transmit the feedback message 220 (e.g., HARQ message) to the network entity 105-*a* within the selected uplink resource (e.g., within the first uplink resource 230-*a* or the second uplink resource 230-*b*). In particular, the UE 115-*a* may transmit the feedback message 220 via the first uplink resource 230-*a* in cases where feedback deferral is not triggered (e.g., no conflict exists), or may transmit the feedback message via a deferred uplink resource 230 (e.g., second uplink resource 230-*b*) in cases where feedback deferral is triggered (e.g., conflict does exist). In this regard, the UE 115-*a* may transmit the feedback message 220 based on receiving the control signaling 210, receiving the downlink message 215, identifying the first uplink resource 230-*a*, determining that the first uplink resource 230-*a* is included within the SBFD slot 235, determining whether a conflict exists (e.g., whether feedback deferral is triggered), identifying/selecting the second uplink resource 230-*b*, or any combination thereof.

For example, in cases where the UE 115-*a* determines that no conflict exists with the first uplink resource 230-*a*, the UE 115-*a* may transmit the feedback message 220 using the first uplink resource 230-*a* (e.g., HARQ deferral not triggered). Conversely, in cases where the UE 115-*a* determines that a conflict exists with the first uplink resource 230-*a*, the UE 115-*a* may transmit the feedback message 220 using the second uplink resource 230-*b* (e.g., HARQ deferral triggered).

In some aspects, the UE 115-*a* may be configured to transmit the feedback message 220 within the selected resource in accordance with an applicable uplink control channel resource configuration, which will be further described with reference to FIG. 4 For example, the control signaling 210 may indicate one or more uplink control channel resource configurations that define the arrangements of uplink resources within different types of slots, such as a first uplink control channel resource configuration for half-duplex slots, and a second uplink control channel resource configuration for full-duplex slots (e.g., SBFD slots). In this regard, the UE 115-*a* may determine what type of slot the feedback message 220 will be transmitted in (e.g., half-duplex or SBFD slot), and may transmit the feedback message 220 in accordance with the applicable uplink control channel resource configuration.

Techniques described herein may enable the half-duplex UE 115-*a* (e.g., SBFD-aware UE 115-*a*) to transmit HARQ feedback within SBFD slots. In particular, aspects of the present disclosure may enable the SBFD-aware UE 115-*a* to identify whether conflicts exist between uplink resources (e.g., PUCCH resources) and resources of a SBFD communication frame structure 225 in accordance with configured conflict conditions. As such, techniques described herein may enable the UE 115-*a* to determine whether HARQ feedback may be transmitted using original uplink resources of an SBFD slot, or whether the HARQ feedback is to be deferred to a future slot. In this regard, techniques described herein may reduce unnecessary deferrals of HARQ feedback, thereby reducing a latency of wireless communications and leading to a more efficient use of wireless resources.

Figure 3:
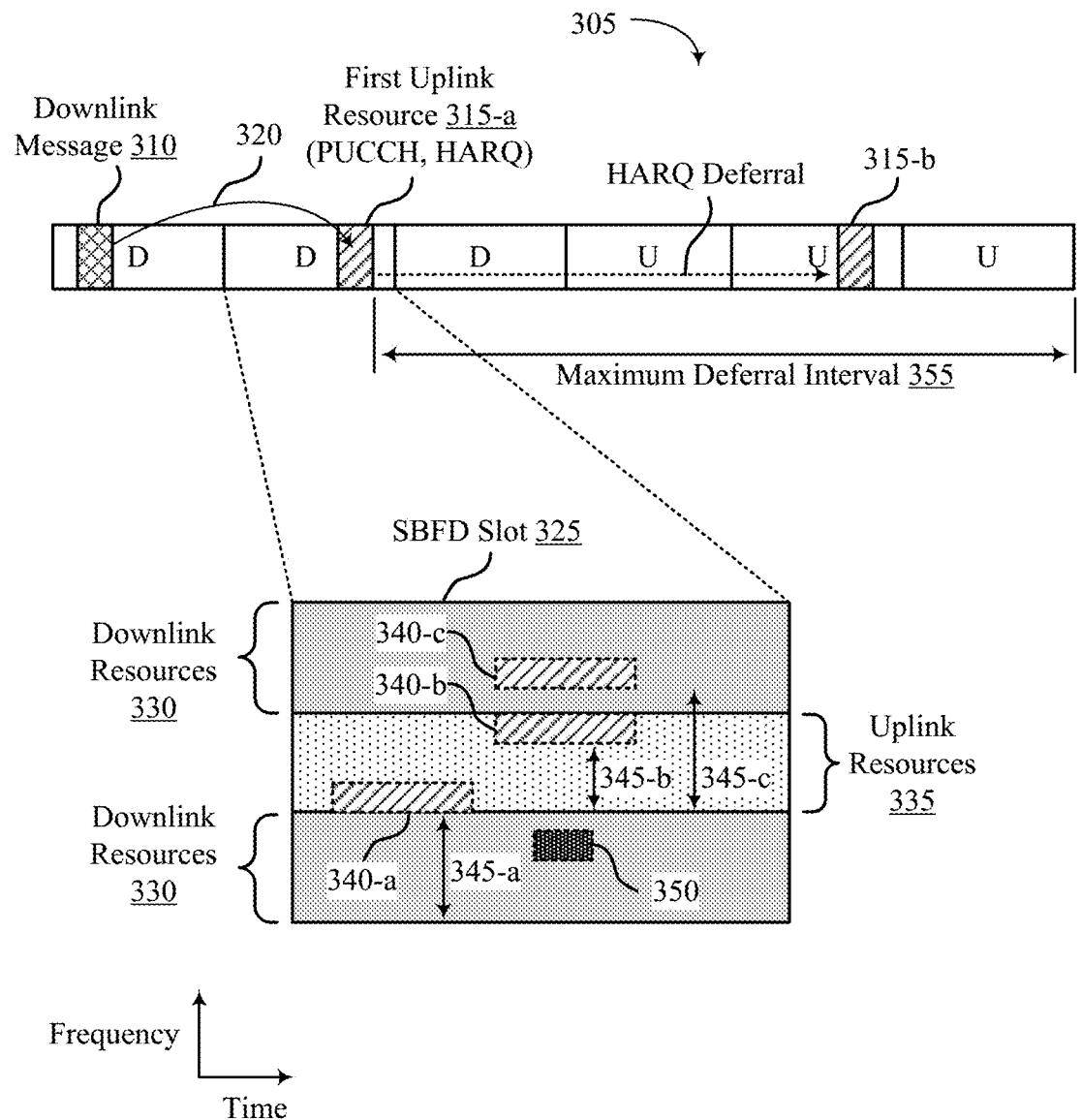
FIG. 3 illustrates an example of a resource configuration that supports techniques for HARQ deferral in full-duplex in accordance with one or more aspects of the present disclosure.

FIG. 3 illustrates an example of a resource configuration 300 that supports techniques for HARQ deferral in full-duplex in accordance with one or more aspects of the present disclosure. Aspects of the resource configuration 300 may implement, or be implemented by, aspects of wireless communications system 100, the wireless communications system 200, or both.

For example, the resource configuration 300 illustrates a communication frame structure 305, which may be an example of the communication frame structure 225 illustrated in FIG. 2. In this regard, the communication frame structure 305 may include a set of slots or TTIs, including downlink slots/TTIs, uplink slots/TTIs, flexible slots/TTIs, or any combination thereof. Moreover, in some implementations, the communication frame structure 305 may include SBFD symbols/slots/TTIs that include resources allocated for both uplink communications and downlink communications. For example, as shown in FIG. 3, the communication frame structure 305 may include an SBFD slot 325, where the SBFD slot 325 includes a set of downlink resources 330 downlink communications and one or more uplink subbands (e.g., uplink resources 335) for uplink communications.

As described previously herein, a UE 115 may receive a downlink message 310 (e.g., SPS PDCCH message) within a set of semi-persistent downlink resources of the communication frame structure 305. That is, the UE 115 may receive the downlink message 310 in accordance with a configured SPS configuration.

In some aspects, the UE 115 may identify a first (initial) slot that may be used for transmitting a HARQ feedback message responsive to the downlink message 310. For example, the UE 115 may identify the SBFD slot 325 relative to the resources used to receive the downlink message 310, and based on some rule or configuration defined by the SPS configuration, such as an offset 320 (e.g., K1 offset).

Upon identifying the first slot (e.g., SBFD slot 325), the UE 115 may identify a first uplink resource 315-*a* in the first slot that may be used to transmit feedback responsive to the downlink message 310. In some aspects, the UE 115 may be configured to identify the first uplink resource 315-*a* within the SBFD slot 325 in accordance with an applicable PUCCH resource configuration. The applicable PUCCH resource configuration may be based on whether or not SPS-PUCCH-AN-List is configured or not (e.g., whether or not this parameter is configured at the UE 115 via RRC signaling).

When SPS-PUCCH-AN-List is provided (e.g., when the parameter is RRC configured under PUCCH-config), then there may be two options for PUCCH resource configurations. Under a first option, two separate PUCCH resource configurations may be configured: (1) a first PUCCH configuration list for half-duplex slots (i.e. non SBFD symbols), and (2) a second PUCCH configuration list for SBFD symbols/slots. Under a second option, a single PUCCH configuration list may be defined, where each PUCCH configuration may be associated with two separate frequency resource configurations mapping to each symbol/slot type (e.g., first frequency resource configuration for half-duplex, and a second frequency resource configuration for full-duplex). Based on the symbol/slot type, e.g. SBFD or non-SBFD, one of the PUCCH list or one of the frequency resource configuration is selected by the UE.

Comparatively, when SPS-PUCCH-AN-List is not provided or configured, then the UE 115 may be configured to determine the PUCCH configuration according to the parameter specific PUCCH resource configured "n1PUCCH-AN," configured within the SPS RRC configuration where there are again two options. Under a first option, two frequency resources may be configured: (1) n1PUCCH-AN, and (2) n1PUCCH-AN-UL-SB. Under a second option, one PUCCH resource is configured with two sets of frequency resource configurations (e.g., first frequency resource configuration for half-duplex, and a second frequency resource configuration for full-duplex).

Under any implementation (e.g., whether or not SPS-PUCCH-AN-List is provided or not, and whether the UE 115 is configured with two separate lists/configurations, or a single configuration with different frequency configurations), the UE 115 may in effect be configured with a first uplink control channel resource configuration (e.g., first PUCCH configuration) for half-duplex slots, and a second uplink control channel resource configuration (e.g., second PUCCH configuration) for full-duplex slots (e.g., SBFD slots 325). Each of the respective uplink control channel resource configurations may indicate relative arrangements of PUCCH resources within the respective slots. For example, a first PUCCH configuration for SBFD slots may indicate that uplink transmissions are to be performed at the edges of the uplink resources 335 (where resources in the middle of the uplink resources 335 may be allocated for PUSCH messages).

In this example, the UE 115 may be configured to identify the relative arrangement of the first uplink resource 315-a in accordance with a PUCCH configuration associated with SBFD slots. Subsequently, the UE 115 may be configured to determine whether feedback deferral is triggered in the SBFD slot 325. In other words, the UE 115 may be configured to determine whether there is a conflict between the first uplink resource 315-a and the resources of the SBFD slot 325. In cases where there is no conflict, feedback deferral may not be triggered, and the UE 115 may transmit a feedback message via the first uplink resource 315-a of the SBFD slot 325. Conversely, in cases where there is a conflict, feedback deferral may be triggered, and the UE 115 may identify a next available slot for a second resource 315-b (e.g., deferred resource) for transmitting the feedback message.

As described previously herein, UE 115 may be configured to determine whether or not a conflict exists for the SBFD slot 325 (and therefore determine whether feedback deferral is triggered or not) based on one or more conflict conditions. The conflict conditions may each define respective rules, thresholds, or conditions that are used to determine whether or not a conflict exists between resources. As such, the UE 115 may be configured to use the conflict conditions to determine whether or not feedback deferral is triggered or not.

For example, in accordance with a first conflict condition, the UE 115 may identify that no conflict exists (e.g., the SBFD slot 325 for uplink resource 315-a is available, therefore feedback deferral is not triggered) if the first uplink resource 315-a (including frequency hopping) is completely within the uplink resources 335 of the SBFD slot 325 in the frequency domain. In this example, the first slot (e.g., SBFD slot 325) is considered available for PUCCH transmission and SPS-HARQ deferral is not triggered. Conversely, according to the first conflict condition, the UE 115 may identify a conflict if at least a portion of the first uplink resource 315-a is outside of the uplink resources 335 of the in the frequency domain. In this example, the first slot (e.g., SBFD slot 325) is considered not to be available for PUCCH transmission, and SPS-HARQ deferral is triggered (in which case the UE 115 identified a second/deferred slot for a second/deferred resource 315-b that may be used to transmit feedback).

In some implementations, the first conflict condition may be evaluated using frequency offsets 345 (which may be defined by applicable PUCCH resource configurations), where the devices determine whether any configured frequency offsets 345 result in the first uplink resource 315-a being completely included within the uplink resources 335 or not. In particular, the RRC configuration may include multiple candidate frequency offsets 345-a, 345-b associated with the resource for HARQ feedback message. For example, the first uplink resource 315-a may include a first portion 340-a, a second portion 340-b, or a third portion 340-c. In this example, the first uplink resource 315-a may be associated with a first frequency offset 345-a, a second frequency offset 345-b, and a third frequency offset 345-a that are associated with the first portion 340-a, the second portion 340-b, and the third portion 340-c, respectively. As such, the frequency offsets 345 may define frequency offsets of the respective portions 340 relative to the border of the SBFD slot 325.

Continuing with the same example, if at least one frequency offset 345 results in the first uplink resource 315-a being completely included within the uplink resources 335, then the UE 115 may determine that no conflict exists (e.g., HARQ deferral not triggered). Comparatively, if all the configured candidate frequency offsets 345 result in the first uplink resource 315-a being at least partially outside of the uplink resources 335, then the UE 115 may determine that a conflict exists (e.g., HARQ deferral triggered).

For instance, as shown in FIG. 3, the UE 115 may identify that the first frequency offset 345-a and/or the second frequency offset 345-b results in the first uplink resource 315-a (including the first portion 340-a and/or the second portion 340-b) being completely included within the uplink resources 335. As such, in this example, the UE 115 may be configured to determine that no conflict exists, and may use the first uplink resource 315-a including the first portion 340-a and/or the second portion 340-b to transmit HARQ feedback. In other words, the UE 115 may apply the frequency offset 345-a and/or the second frequency offset 345-b to the PUCCH starting RB such that the first uplink resource 315-a maps to the uplink subbands (e.g., uplink resources 335) of the SBFD slot 325.

In accordance with a second conflict condition, the UE 115 may evaluate whether a conflict exists with the first uplink resource 315-a in the SBFD slot 325 (e.g., whether feedback deferral is triggered for the SBFD slot 325) based on whether or not the first uplink resource 315-a overlaps with other resources 350 of the SBFD slot 325 in the time domain. Other applicable resources 350 that may be considered for conflict evaluation may include, but are not limited to, resources for SSBs, resources for a CORESET Type 0 PDCCH CSS, or both.

For example, in accordance with the second conflict condition, the UE 115 may be configured to identify a conflict if the first uplink resource 315-a overlaps in the time domain with an additional resource 350 associated with an SSB, a CSS, or both. In this example, HARQ deferral may be triggered (e.g., UE 115 cancels/drops the SPS ACK/NACK transmission in the SBFD slot 325 configured with resources 350 for SSB or Type 0 CSS). The UE considers the first slot not available for transmission, and then UE determines a second slot. Conversely, the UE 115 may be configured to identify that no conflict exists if the first uplink resource 315-a is completely within the uplink resources 335 in the frequency domain (including hopping), in which case HARQ deferral is not triggered. In such cases where HARQ is not deferred (and the first uplink resource 315-a is used to transmit the feedback message), different power control parameters may be used for the feedback message to reduce possible cross-link interference to other UE(s) 115 that are configured to receive messages within the resources 350 associated with SSB/CSS.

In this regard, the UE 115 may be configured to trigger HARQ deferral (e.g., use the second uplink resource 315-*b*) if the first uplink resource 315-*a* is partially or fully outside of the uplink resources 335 in the frequency domain, and/or if the first uplink resource 315-*a* overlaps with an additional resource 350 in the time domain.

In some cases, relative priorities between the first uplink resource 315-*a* (HARQ feedback messages) and the additional resource 350 (SSBs, CSSs) may be used to determine whether a conflict exists (e.g., whether feedback deferral is triggered). For example, in some cases, the first uplink resource 315-*a* (and/or corresponding HARQ feedback message) may be associated with a first priority, and the additional resource (and/or corresponding SSB/CSS) may be associated with a second priority. In this example, if the first priority is greater than the second priority (e.g., HARQ feedback prioritized over SSB/CSS), then the UE 115 may determine that no conflict exists even if the first uplink resource 315-*a* overlaps with the additional resource 350 in the time domain. As such, if no conflict exists, HARQ deferral would not be triggered. Conversely, if the first priority is less than the second priority (e.g., SSB/CSS prioritized over HARQ feedback), then the UE 115 may determine that a conflict exists if the first uplink resource 315-*a* overlaps with the additional resource 350 in the time domain. As such, if a conflict exists, HARQ deferral would be triggered.

As noted previously herein, if the UE 115 determines that a conflict exists, HARQ deferral may be triggered, and the UE 115 may select to use a second (deferred) uplink resource 315-*b* for transmitting the HARQ feedback. In such cases, the UE 15 may determine a next available slot that may be used for transmitting the HARQ feedback based on a semi-static configuration (e.g., communication frame structure 305 including uplink/downlink subband configurations).

In some aspects, as such, when HARQ deferral is triggered, the UE 115 may be configured to identify the next available slot (i.e. a second slot) within the communication frame structure 305 that can accommodate the feedback message/second uplink resource 315-*b*. In some implementations, what qualifies as the "next available slot/TTI" may be based on semi-static configuration (e.g., TDD-uplink/downlink configuration, PUCCH configuration, SPS configuration, uplink/downlink subband configuration, etc.).

For example, in some cases, the UE 115 may identify the next available slot as the next uplink slot, next flexible slot (e.g., flexible slot with uplink subbands), or next SBFD slot with sufficient time resources to accommodate the HARQ feedback message, and/or the next available slot that has sufficient time resources and sufficient frequency resources to accommodate the feedback message. For instance, the UE 115 may determine next available slot as the next uplink slot, the next flexible slot, the next downlink slot with uplink subbands, or the next flexible slot with uplink subbands that has sufficient time resources to accommodate the HARQ feedback message. By way of another example, the UE 115 may determine the next available slot as the next uplink slot, the next flexible slot, the next downlink slot with uplink subbands, or the next flexible slot with uplink subbands that has both sufficient time resources and sufficient frequency resources to accommodate the HARQ feedback message.

Moreover, in some implementations, the UE 115 may be configured to identify the next available slot (i.e. a second slot) for the second uplink resource 315-*b* based on a configured maximum deferral interval 355. As described previously herein, the maximum deferral interval 355 may indicate the maximum amount of time that a feedback message may be deferred. As such, as shown in FIG. 3, upon identifying that HARQ deferral is triggered, the UE 115-*b* may be configured to identify a second slot (and a second uplink resource 315-*b* within the second slot) that is within the configured maximum deferral interval 355.

In some aspects, upon identifying the next available slot that may be used to transmit feedback, the UE 115 may identify a second uplink resource 315-*b* within the next available slot. In particular, the UE 115 may identify the relative arrangement of the second uplink resource 315-*b* within the next available slot (e.g., second slot) in accordance with an applicable PUCCH configuration. For instance, as noted previously herein, different PUCCH resource configurations may be defined for different types of slots. For example, the network may define a first set/list of PUCCH resource configurations for SBFD slots, and a second set/list of PUCCH resource configurations for half-duplex slots. As such, in this example, if the next available slot is an SBFD slot, the UE 115 may be configured to identify the second uplink resource 315-*b* within the second slot in accordance with a PUCCH resource configuration associated with SBFD slots. Comparatively, if the next available slot is a half-duplex slot, the UE 115 may be configured to identify the second uplink resource 315-*b* within the second slot in accordance with a PUCCH resource configuration associated with half-duplex slots.

As such, in cases where the UE 115 determines that no conflict exists (e.g., HARQ deferral not triggered), the UE 115 may be configured to transmit the feedback message within the first uplink resource 315-*a* and in accordance with a PUCCH configuration associated with SBFD slots 325. Comparatively, in cases where HARQ deferral is triggered to the second uplink resource 315-*b* included within a half-duplex slot, the UE 115 may be configured to transmit the feedback message within the second uplink resource 315-*b* and in accordance with a PUCCH configuration associated with half-duplex slots. Moreover, in cases where HARQ deferral is triggered to the second uplink resource 315-*b* included within an SBFD slot, the UE 115 may be configured to transmit the feedback message within the second uplink resource 315-*b* and in accordance with a PUCCH configuration associated with SBFD slots.

Figure 4:
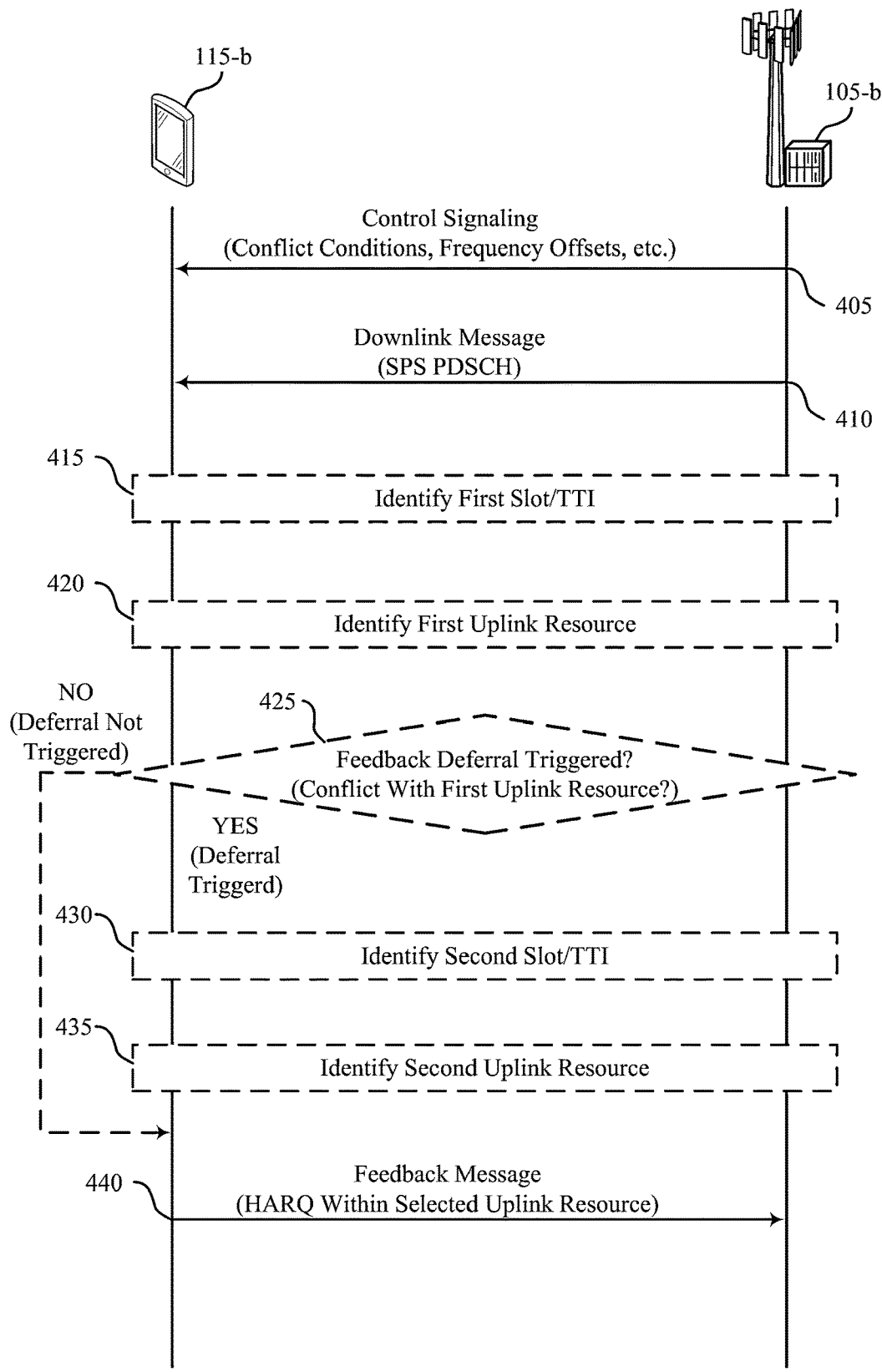
FIG. 4 illustrates an example of a process flow that supports techniques for HARQ deferral in full-duplex in accordance with one or more aspects of the present disclosure.

FIG. 4 illustrates an example of a process flow 400 that supports techniques for HARQ deferral in full-duplex in accordance with one or more aspects of the present disclosure. Aspects of the process flow 400 may implement, or be implemented by, aspects of wireless communications system 100, the wireless communications system 200, the resource configuration 300, or any combination thereof. For example, the process flow 400 illustrates techniques for identifying conflicts between uplink resources and resources of an SBFD frame structure, as described previously herein.

The process flow 400 includes a UE 115-*b* and a network entity 105-*b*, which may be examples of UEs 115, network entities 105, and other wireless devices as described herein. For example, the UE 115-*b* and the network entity 105-*b* illustrated in FIG. 4 may include examples of the UE 115-*a* and the network entity 105-*a*, respectively, as illustrated in FIG. 2. In this regard, the network entity 105-*b* may include a full-duplex device, and the UE 115-*b* may include an SBFD-aware device.

In some examples, the operations illustrated in process flow 400 may be performed by hardware (e.g., including circuitry, processing blocks, logic components, and other components), code (e.g., software executed by a processor), or any combination thereof. Alternative examples of the following may be implemented, where some steps are performed in a different order than described or are not performed at all. In some cases, steps may include additional features not mentioned below, or further steps may be added.

At 405, the UE 115-*b* may receive control signaling (e.g., RRC, DCI, MAC-CE) from the network entity 105-*b*, where the control signaling indicates an SPS configuration for communications between the UE 115-*b* and the network entity 105-*b*. That is, the control signaling may indicate an SPS configuration that includes semi-persistent downlink resources for SPS downlink messages from the network entity 105-*b* to the UE 115-*b* within a communication frame structure (e.g., within an SBFD communication frame structure). The SPS configuration may further indicate relationships between HARQ feedback responsive to the SPS downlink messages (e.g., relationships for determining resources for HARQ feedback based on resources used to communicate SPS downlink messages).

In some implementations, the control signaling (e.g., SPS configuration) may additionally or alternatively indicate one or more conflict conditions for identifying conflicts between SPS HARQ messages (e.g., feedback messages responsive to SPS downlink messages) and resources of the communication frame structure. That is, the UE 115-*b* may be configured with conflict conditions that define rules for determining whether HARQ feedback may be transmitted within an initial HARQ feedback resource (e.g., based on identification of no conflict), or whether the HARQ feedback is to be deferred to a future resource (e.g., based on identification of a conflict).

In some aspects, the control signaling may indicate additional or alternative parameters associated with the SPS configuration, the communication frame structure, the conflict conditions, or any combination thereof. For example, the control signaling may indicate candidate frequency offsets associated with uplink resources, priorities associated with HARQ feedback messages and/or other types of messages/resources (which may be used to identify and/or resolve conflicts), uplink control channel resource configurations associated with different types of slots/TTIs, maximum deferral times for HARQ feedback (e.g., maximum amount of time that a HARQ feedback message may be deferred), or any combination thereof.

At 410, the UE 115-*b* may receive a downlink message from the network entity 105-*b*. In particular, the UE 115-*b* may receive a downlink message (e.g., SPS PDSCH message) within the set of semi-persistent downlink resources of the SPS configuration indicated at 405. As such, the UE 115-*b* may receive the downlink message at 410 based on receiving the control signaling at 405.

At 415, the UE 115-*b*, the network entity 105-*b*, or both, may identify a first slot (e.g., first TTI) that may be used to transmit feedback responsive to the downlink message 410. For example, the first slot/TTI may be identified relative to the resources used to transmit/receive the downlink message, and based on some rule or configuration (e.g., K1 offset) defined by the SPS configuration, such as the offset 320 illustrated in FIG. 3. In some aspects, the first slot may include an SBFD slot that includes one or more uplink subbands, such as the SBFD slot 325 illustrated in FIG. 3.

At 420, the UE 115-*b*, the network entity 105-*b*, or both, may identify a first (initial) uplink resource that may be used for transmitting a HARQ feedback message responsive to the downlink message. In particular, the UE 115-*b* and/or the network entity 105-*b* may identify the first resource within the first slot/TTI that was identified at 415. For example, the UE 115-*b* and/or the network entity 105-*b* may identify the first uplink resource 230-*a* of the SBFD slot 235 illustrated in FIG. 2, or the first uplink resource 315-*a* of the SBFD slot 325 illustrated in FIG. 3.

The UE 115-*b* and/or the network entity 105-*b* may identify the first uplink resource at 420 based on receiving the control signaling at 405, receiving the downlink message at 410, or both. In some aspects, the UE 115-*b* and/or the network entity 105-*b* may determine the first uplink resource based on one or more uplink resource configurations (e.g., PUCCH resource configurations) configured via the control signaling at 405. As noted previously herein, the PUCCH resource configuration used to determine the first uplink resource within the first slot may be dependent upon whether SPS-PUCCH-AN-List is configured or not. For instance, in some cases, the control signaling at 405 may configure separate lists of PUCCH configurations that define uplink resources within SBFD slots and half-duplex slots. In such cases, the UE 115-*b* and/or the network entity 105-*b* may determine the first uplink resource within the first slot in accordance with a PUCCH configuration associated with SBFD slots (due to the fact that the first slot identified at 415 is an SBFD slot).

In some aspects, the respective wireless devices may be configured to evaluate whether or not there is a conflict between the first uplink resource and the communication frame structure based on the first uplink resource being included within an SBFD slot that includes one or more uplink subbands.

For example, in the context of half-duplex communication frame structures, if the first uplink resource were included within a static downlink slot, the devices may automatically identify a conflict and determine that the HARQ feedback will be deferred. However, in the context of SBFD communication frame structures, the inclusion of the first uplink resource within a downlink slot may not necessarily result in a conflict, as the downlink slot may include one or more uplink subbands (e.g., SBFD slot) that may still be used to communicate the HARQ feedback. As such, if the devices determine that the first uplink resource is included within an SBFD slot, the respective devices may be triggered to evaluate whether or not there is a conflict (e.g., whether or not the first uplink resource may still be used for HARQ feedback) using the configured conflict conditions.

At 425, the UE 115-*b*, the network entity 105-*b*, or both, may determine whether or not feedback deferral for a feedback message responsive to the downlink message is triggered or not. In other words, the respective devices may evaluate whether or not there is a conflict between the first uplink resource (e.g., uplink resource) and the resources of the communication frame structure. In particular, the devices may determine whether or not feedback deferral is triggered (e.g., whether there is a conflict) based on the one or more conflict conditions. In this regard, the respective devices may be configured to evaluate whether feedback deferral is triggered (e.g., determine the existence of a conflict) at 430 based on receiving/transmitting the control signaling at 405, receiving/transmitting the downlink message at 410, identifying the first slot at 415, identifying the first uplink resource at 420, or any combination thereof.

As described previously herein, the conflict conditions may each define respective rules, thresholds, or conditions that are used to determine whether or not a conflict exists between resources, where feedback deferral is triggered in cases where a conflict exists, and where feedback deferral is not triggered in cases where no conflict exists. In other words, the conflict conditions may be used by the respective devices to determine whether or not feedback deferral is triggered or not.

For example, in accordance with a first conflict condition, the devices may identify that no conflict exists (e.g., feedback deferral not triggered) if the first resource is completely included within the uplink subbands of the SBFD slot in the frequency domain. Conversely, according to the first conflict condition, the devices may identify a conflict (e.g., feedback deferral is triggered) if at least a portion of the first uplink resource is outside of the uplink subbands in the frequency domain (and therefore HARQ deferral). In some implementations, the first conflict condition may be evaluated using frequency offsets, where the devices determine whether any configured frequency offsets result in the first uplink resource being completely included within the uplink subbands in the frequency domain (resulting in no conflict and no feedback deferral), or whether all configured frequency offsets result in the first uplink resource being at least partially outside of the uplink subbands in the frequency domain (resulting in a conflict and feedback deferral).

For example, in accordance with a second conflict condition, the devices may evaluate whether feedback deferral is triggered (e.g., whether a conflict exists) based on whether or not the first uplink resource overlaps with other resources of the SBFD slot in the time domain, such as SSB resources, resources for a CORESET Type 0 PDCCH CSS, or both. In such cases, relative priorities between the first uplink resource (e.g., PUCCH/HARQ resource) and the additional resources (e.g., SSB resources, CORESET CSS resources) may be used to determine whether a conflict exists, as described previously herein with respect to FIG. 3. The relative priorities of the respective resources/types of messages may be indicated via the control signaling at 405.

In cases where the devices determine that feedback deferral is not triggered (e.g., no conflict exists between the first uplink resource and the resources of the communication frame structure) (e.g., step 430=NO), the process flow 400 may proceed to step 440, in which case the UE 115-b uses the first uplink resource to transmit the feedback message responsive to the downlink message. That is, in cases where no conflict exists, HARQ deferral may not be trigged, and the UE 115-b may transmit the HARQ feedback message within the originally configured uplink resource.

Conversely, in cases where the devices determine that feedback deferral is triggered (e.g., a conflict does exist between the first uplink resource and the resources of the communication frame structure) (e.g., step 430=YES), the process flow 400 may proceed to step 435.

At 430, the UE 115-b, the network entity 105-b, or both, may identify a second slot (e.g., second TTI) that may be used to transmit feedback responsive to the downlink message 410. In other words, the UE 115-b and/or the network entity 105-b may identify the next available slot that may be used to transmit the feedback message.

For example, UE 115-b and/or the network entity 105-b may be configured to identify the next available slot as the next uplink slot, next flexible slot (e.g., flexible slot with uplink subbands), or next SBFD slot with sufficient time resources and/or frequency resources to accommodate the HARQ feedback message. Moreover, in some cases, the devices may be configured to identify the second slot based on (e.g., within) a maximum deferral interval associated with deferral of HARQ feedback, which may be configured via the control signaling at 405. In other words, the devices may be configured to identify a next available slot within the maximum deferral interval.

In this regard, the UE 115-b and/or the network entity 105-b may identify the second slot (e.g., next available slot) at 430 based on receiving/transmitting the control signaling at 405, receiving/transmitting the downlink message at 410, determining that feedback deferral is triggered at 425, or any combination thereof.

At 435, the UE 115-b, the network entity 105-b, or both, may identify or select a second uplink resource that will be used to communicate the HARQ feedback message. In particular, the UE 115-b and/or the network entity 105-b may identify a first uplink slot that is usable for transmitting a HARQ feedback message within the first slot/TTI that was identified at 415. As noted previously, the devices may be configured to identify the second uplink resource based on (e.g., within) a maximum deferral interval associated with deferral of HARQ feedback, which may be configured via the control signaling at 405.

Moreover, in some aspects, the UE 115-b and/or the network entity 105-b may determine the second uplink resource based on one or more uplink resource configurations (e.g., PUCCH resource configurations) configured via the control signaling at 405. As noted previously herein, the PUCCH resource configuration used to determine the second uplink resource within the second slot may be dependent upon whether SPS-PUCCH-AN-List is configured or not. For instance, in some cases, the control signaling at 405 may configure separate lists of PUCCH configurations that define uplink resources within SBFD slots and half-duplex slots. In such cases, if the second slot (e.g., next available slot) includes a SBFD slot, the UE 115-b and/or the network entity 105-b may determine the second uplink resource within the second slot in accordance with a PUCCH configuration associated with SBFD slots. Conversely, if the second slot (e.g., next available slot) includes a half-duplex slot, the UE 115-b and/or the network entity 105-b may determine the second uplink resource within the second slot in accordance with a PUCCH configuration associated with half-duplex slots.

At 440, the UE 115-b may transmit the feedback message (e.g., HARQ message) to the network entity 105-b. In particular, the UE 115-b may transmit the feedback message within the first uplink resource in cases where feedback deferral is not triggered, or within the second uplink resource in cases where feedback deferral is triggered. In this regard, the UE 115-b may transmit the feedback message at 440 based on receiving the control signaling at 405, receiving the downlink message at 410, identifying the first slot at 415, identifying the first uplink resource at 420, determining whether feedback deferral is triggered at 425, identifying the second slot at 430, identifying the second uplink resource at 435, or any combination thereof.

For example, in cases where the UE 115-b determines that feedback deferral is not triggered (e.g., no conflict exists with the first uplink resource) at 430, the UE 115-b may transmit the feedback message using the first uplink resource (e.g., HARQ deferral not triggered). Conversely, in cases where the UE 115-b determines that feedback deferral is triggered (e.g., a conflict does exist with the first uplink resource) at 430, the UE 115-b may transmit the feedback message using the second uplink resource (e.g., HARQ deferral triggered).

Techniques described herein may enable the half-duplex UE 115-b (e.g., SBFD-aware UE 115-b) to transmit HARQ feedback within SBFD slots. In particular, aspects of the present disclosure may enable the SBFD-aware UE 115-b to identify whether conflicts exist between uplink resources (e.g., PUCCH resources, HARQ resources) and resources of a SBFD communication frame structure in accordance with configured conflict conditions. As such, techniques described herein may enable the UE 115-*b* to determine whether HARQ feedback may be transmitted using original uplink resources of an SBFD slot, or whether the HARQ feedback is to be deferred to a future slot. In this regard, techniques described herein may reduce unnecessary deferrals of HARQ feedback, thereby reducing a latency of wireless communications and leading to a more efficient use of wireless resources.

Figure 5:
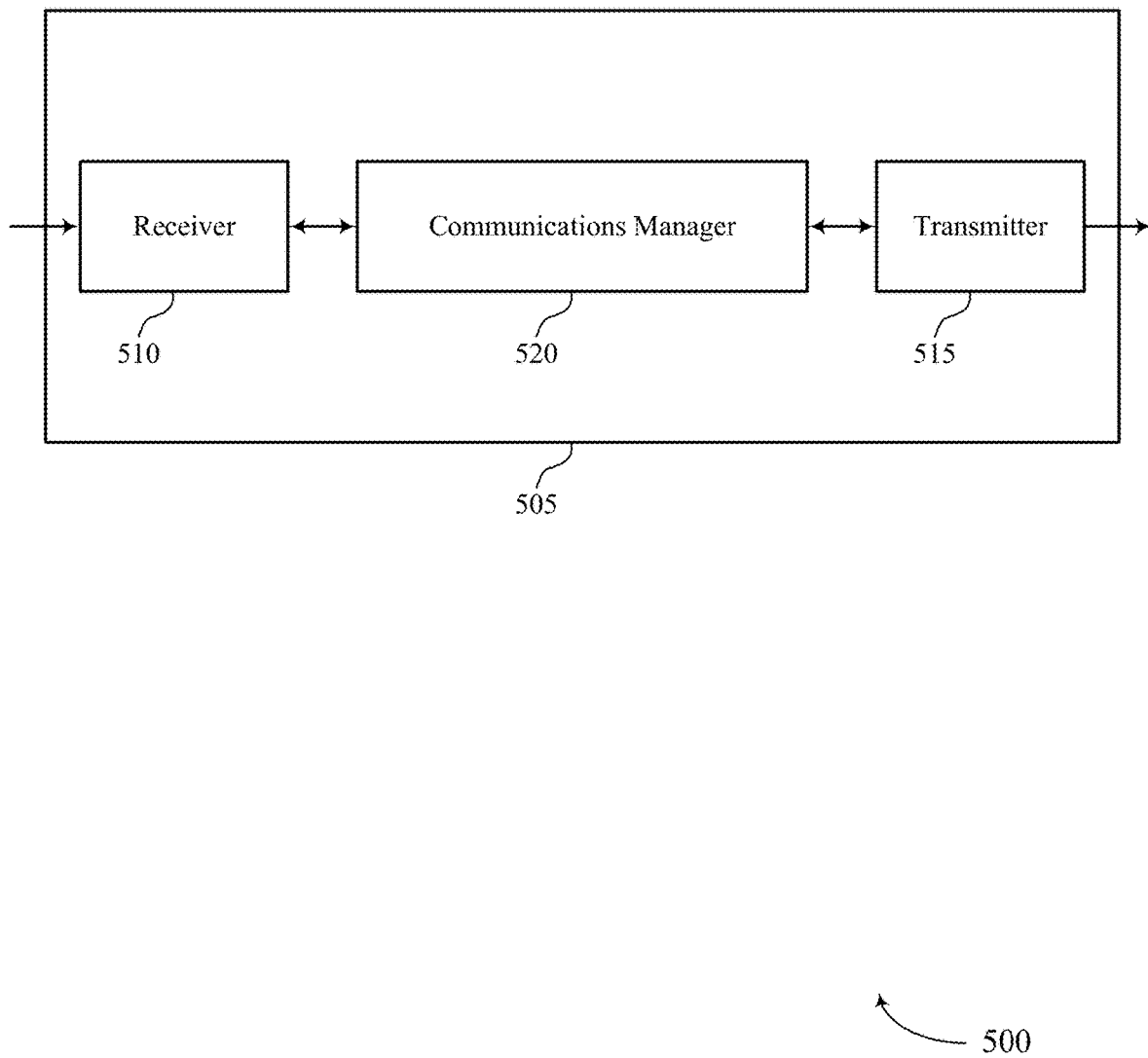
FIGS. 5 and 6 illustrate block diagrams of devices that support techniques for HARQ deferral in full-duplex in accordance with one or more aspects of the present disclosure.

FIG. 5 illustrates a block diagram 500 of a device 505 that supports techniques for HARQ deferral in full-duplex in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for HARQ deferral in full-duplex). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for HARQ deferral in full-duplex). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for HARQ deferral in full-duplex as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), a graphics processing unit (GPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software) executed by a processor. If implemented in code executed by a processor, the functions of the communications manager 520, the receiver 510, the transmitter 515, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. For example, the communications manager 520 may be configured as or otherwise support a means for receiving an indication of one or more conflict conditions for identification of conflicts between uplink feedback messages and a communication frame structure. The communications manager 520 may be configured as or otherwise support a means for receiving a downlink message within a set of semi-persistent downlink resources. The communications manager 520 may be configured as or otherwise support a means for selecting between a first uplink resource and a second uplink resource for transmitting a feedback message associated with the downlink message based on the one or more conflict conditions, where the selecting is based on the first uplink resource being included within an SBFD slot of the communication frame structure that includes one or more uplink subbands, and where the second uplink resource is subsequent to the first uplink resource. The communications manager 520 may be configured as or otherwise support a means for transmitting the feedback message associated with the downlink message in the first uplink resource or the second uplink resource in accordance with the selecting.

By including or configuring the communications manager 520 in accordance with examples as described herein, the device 505 (e.g., a processor controlling or otherwise coupled with the receiver 510, the transmitter 515, the communications manager 520, or a combination thereof) may support techniques that enable UEs 115 that are capable of half-duplex communications to nonetheless transmit HARQ feedback within SBFD slots. In particular, aspects of the present disclosure may enable SBFD-aware UEs 115 to identify whether conflicts exist between uplink resources and resources of a SBFD communication frame structure in accordance with configured conflict conditions. As such, techniques described herein may enable UEs 115 to determine whether HARQ feedback may be transmitted using original uplink resources of an SBFD slot, or whether the HARQ feedback is to be deferred to a future slot. In this regard, techniques described herein may reduce unnecessary deferrals of HARQ feedback, thereby reducing a latency of wireless communications and leading to a more efficient use of wireless resources.

Figure 6:
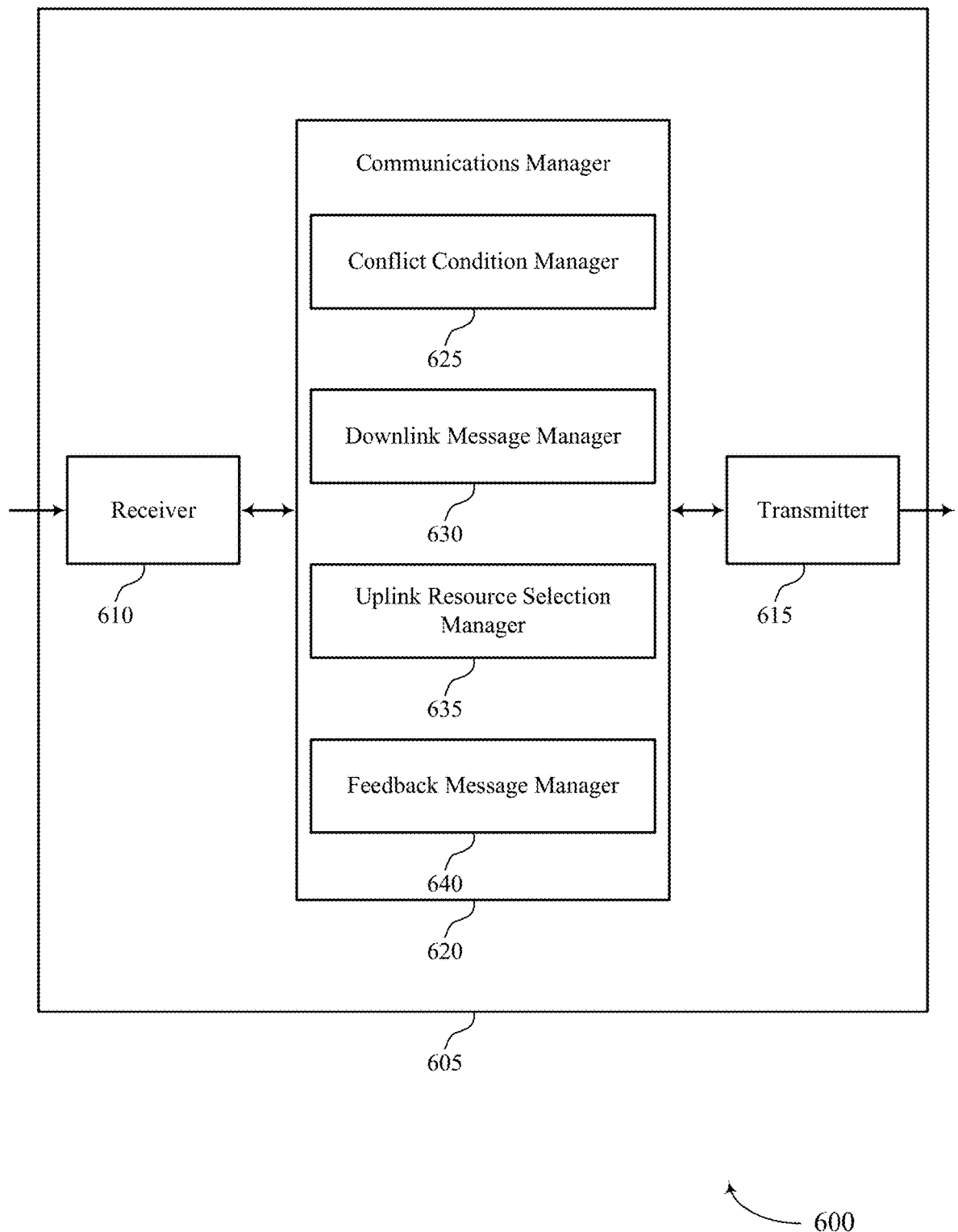

FIG. 6 illustrates a block diagram 600 of a device 605 that supports techniques for HARQ deferral in full-duplex in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for HARQ deferral in full-duplex). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for HARQ deferral in full-duplex). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for HARQ deferral in full-duplex as described herein. For example, the communications manager 620 may include a conflict condition manager 625, a downlink message manager 630, an uplink resource selection manager 635, a feedback message manager 640, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a UE in accordance with examples as disclosed herein. The conflict condition manager 625 may be configured as or otherwise support a means for receiving an indication of one or more conflict conditions for identification of conflicts between uplink feedback messages and a communication frame structure. The downlink message manager 630 may be configured as or otherwise support a means for receiving a downlink message within a set of semi-persistent downlink resources. The uplink resource selection manager 635 may be configured as or otherwise support a means for selecting between a first uplink resource and a second uplink resource for transmitting a feedback message associated with the downlink message based on the one or more conflict conditions, where the selecting is based on the first uplink resource being included within an SBFD slot of the communication frame structure that includes one or more uplink subbands, and where the second uplink resource is subsequent to the first uplink resource. The feedback message manager 640 may be configured as or otherwise support a means for transmitting the feedback message associated with the downlink message in the first uplink resource or the second uplink resource in accordance with the selecting.

Figure 7:
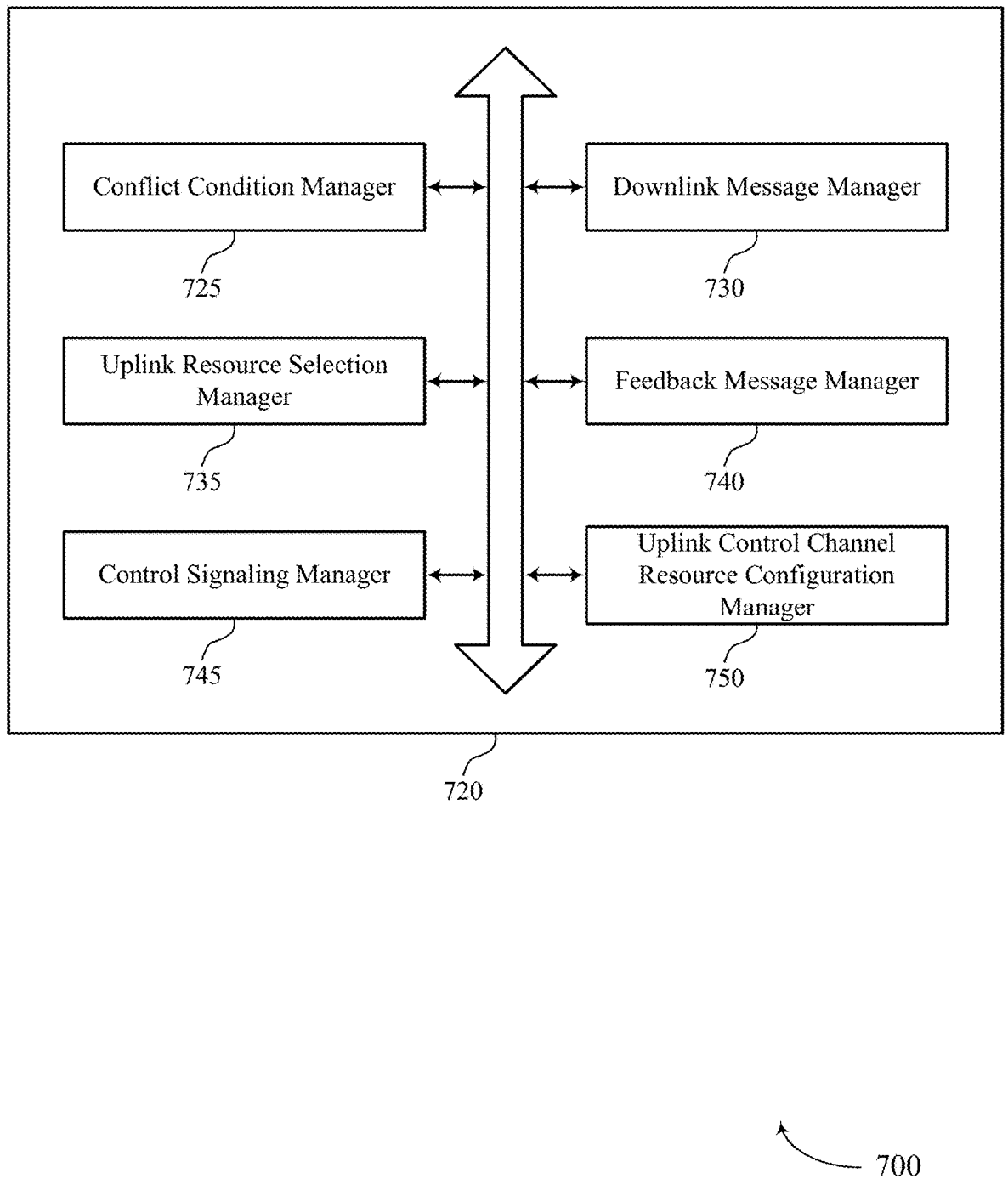
FIG. 7 illustrates a block diagram of a communications manager that supports techniques for HARQ deferral in full-duplex in accordance with one or more aspects of the present disclosure.

FIG. 7 illustrates a block diagram 700 of a communications manager 720 that supports techniques for HARQ deferral in full-duplex in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for HARQ deferral in full-duplex as described herein. For example, the communications manager 720 may include a conflict condition manager 725, a downlink message manager 730, an uplink resource selection manager 735, a feedback message manager 740, a control signaling manager 745, an uplink control channel resource configuration manager 750, or any combination thereof. Each of these components may communicate, directly or indirectly, with one another (e.g., via one or more buses).

The communications manager 720 may support wireless communication at a UE in accordance with examples as disclosed herein. The conflict condition manager 725 may be configured as or otherwise support a means for receiving an indication of one or more conflict conditions for identification of conflicts between uplink feedback messages and a communication frame structure. The downlink message manager 730 may be configured as or otherwise support a means for receiving a downlink message within a set of semi-persistent downlink resources. The uplink resource selection manager 735 may be configured as or otherwise support a means for selecting between a first uplink resource and a second uplink resource for transmitting a feedback message associated with the downlink message based on the one or more conflict conditions, where the selecting is based on the first uplink resource being included within an SBFD slot of the communication frame structure that includes one or more uplink subbands, and where the second uplink resource is subsequent to the first uplink resource. The feedback message manager 740 may be configured as or otherwise support a means for transmitting the feedback message associated with the downlink message in the first uplink resource or the second uplink resource in accordance with the selecting.

In some examples, to support selecting, the uplink resource selection manager 735 may be configured as or otherwise support a means for selecting the first uplink resource based on the first uplink resource being included within the one or more uplink subbands of the SBFD slot in a frequency domain, where the feedback message is transmitted within the first uplink resource based on the selecting.

In some examples, to support selecting, the uplink resource selection manager 735 may be configured as or otherwise support a means for selecting the second uplink resource based on a portion of the first uplink resource being located outside of the one or more uplink subbands of the SBFD slot in a frequency domain, where the feedback message is transmitted within the second uplink resource based on the selecting.

In some examples, the control signaling manager 745 may be configured as or otherwise support a means for receiving control signaling indicating one or more candidate frequency offsets associated with the first uplink resource within the SBFD slot. In some examples, the uplink resource selection manager 735 may be configured as or otherwise support a means for selecting the first uplink resource based on the first uplink resource being included within the one or more uplink subbands of the SBFD slot in a frequency domain using a frequency offset of the one or more candidate frequency offsets, where the feedback message is transmitted within the first uplink resource based on the selecting and in accordance with the frequency offset of the one or more candidate frequency offsets.

In some examples, to support selecting, the uplink resource selection manager 735 may be configured as or otherwise support a means for selecting the second uplink resource based on the first uplink resource at least partially overlapping in a time domain with an additional resource within the SBFD slot that is associated with an SSB, a CSS, or both, where the feedback message is transmitted within the second uplink resource based on the selecting.

In some examples, to support selecting, the uplink resource selection manager 735 may be configured as or otherwise support a means for selecting the first uplink resource based on the first uplink resource being included within the one or more uplink subbands of the SBFD slot in a frequency domain, and despite the first uplink resource at least partially overlapping in a time domain with an additional resource within the SBFD slot that is associated with an SSB, a CSS, or both, where the feedback message is transmitted within the first uplink resource based on the selecting.

In some examples, the control signaling manager 745 may be configured as or otherwise support a means for receiving control signaling indicating a first priority associated with the feedback message and a second priority associated with the SSB, the CSS, or both, where the selecting is based on a comparison of the first priority and the second priority.

In some examples, to support selecting, the uplink resource selection manager 735 may be configured as or otherwise support a means for selecting the second uplink resource based on a portion of the first uplink resource being located outside of the one or more uplink subbands of the SBFD slot in a frequency domain, and based on the first uplink resource at least partially overlapping in a time domain with an additional resource within the SBFD slot that is associated with an SSB, a CSS, or both, where the feedback message is transmitted within the second uplink resource based on the selecting.

In some examples, the uplink control channel resource configuration manager 750 may be configured as or otherwise support a means for receiving control signaling indicating a first set of uplink control channel resource configurations associated with half-duplex slots, and a second set of uplink control channel resource configurations associated with SBFD slots, where selecting between the first uplink resource and the second uplink resource is based on the second uplink resource being associated with the first set of uplink control channel resource configurations.

In some examples, to support transmitting the feedback message, the uplink control channel resource configuration manager 750 may be configured as or otherwise support a means for transmitting the feedback message within the second uplink resource and in accordance with the first set of uplink control channel resource configurations based on the additional slot including a half-duplex slot, and transmitting the feedback message within the second uplink resource and in accordance with the second set of uplink control channel resource configurations based on the additional slot including an SBFD slot.

In some examples, the control signaling manager 745 may be configured as or otherwise support a means for receiving an indication of a maximum deferral interval associated with deferral of feedback messages, where selecting the second uplink resource includes selecting the second uplink resource within the maximum deferral interval.

In some examples, to support selecting, the uplink resource selection manager 735 may be configured as or otherwise support a means for selecting the second uplink resource based on the second uplink resource being included within a first uplink slot following the SBFD slot, a first flexible slot following the SBFD slot, or an additional SBFD slot including one or more additional uplink subbands following the SBFD slot.

In some examples, to support selecting, the uplink resource selection manager 735 may be configured as or otherwise support a means for selecting the second uplink resource based on the first uplink slot, the first flexible slot, or the additional SBFD slot including a threshold quantity of uplink time and frequency resources to accommodate the second uplink resource. In some examples, the UE is capable of performing half-duplex communications. In some examples, the UE includes an SBFD-aware UE.

Figure 8:
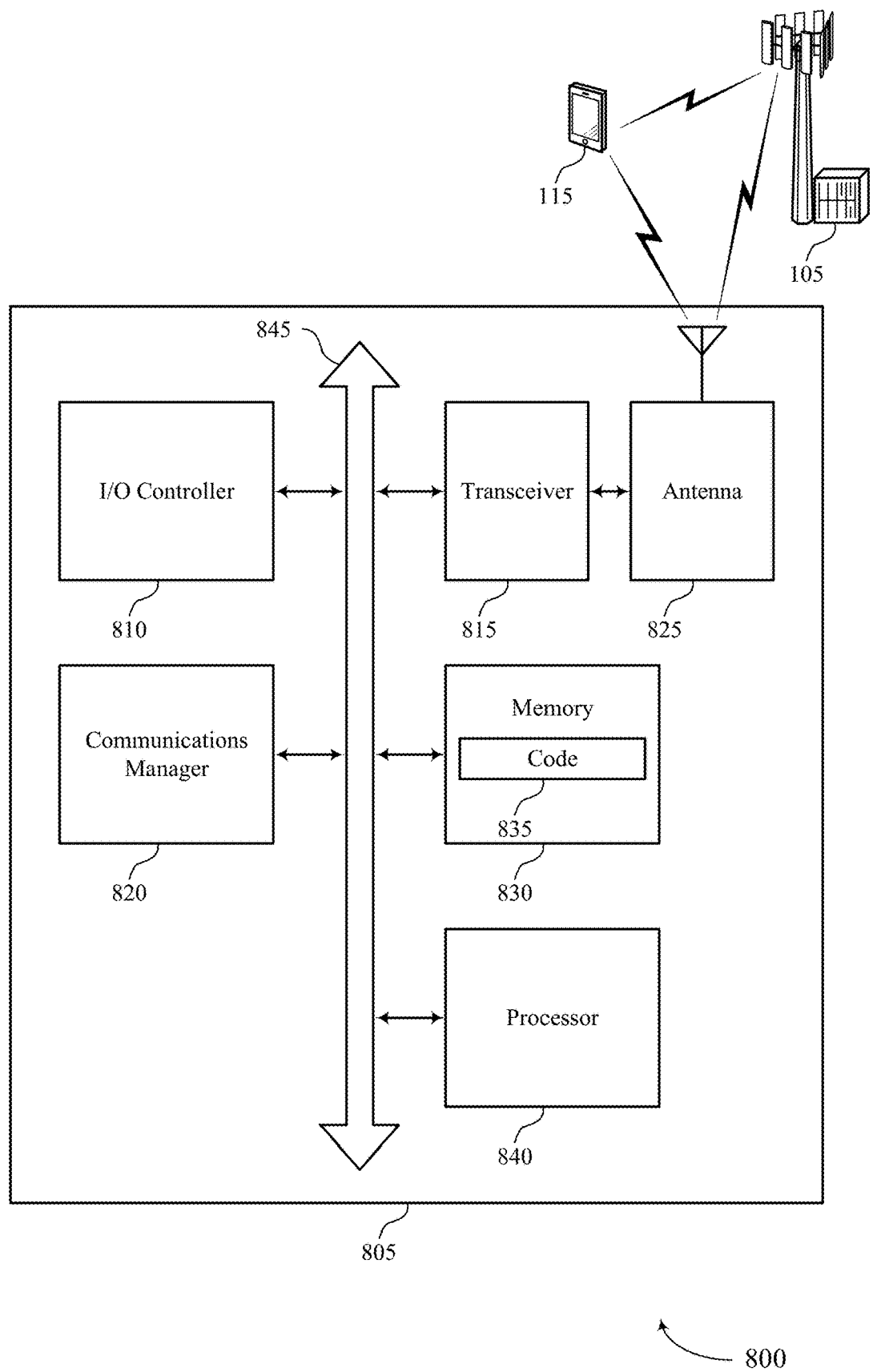
FIG. 8 illustrates a diagram of a system including a device that supports techniques for HARQ deferral in full-duplex in accordance with one or more aspects of the present disclosure.

FIG. 8 illustrates a diagram of a system 800 including a device 805 that supports techniques for HARQ deferral in full-duplex in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for HARQ deferral in full-duplex). For example, the device 805 or a component of the device 805 may include a processor 840 and memory 830 coupled with or to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving an indication of one or more conflict conditions for identification of conflicts between uplink feedback messages and a communication frame structure. The communications manager 820 may be configured as or otherwise support a means for receiving a downlink message within a set of semi-persistent downlink resources. The communications manager 820 may be configured as or otherwise support a means for selecting between a first uplink resource and a second uplink resource for transmitting a feedback message associated with the downlink message based on the one or more conflict conditions, where the selecting is based on the first uplink resource being included within an SBFD slot of the communication frame structure that includes one or more uplink subbands, and where the second uplink resource is subsequent to the first uplink resource. The communications manager 820 may be configured as or otherwise support a means for transmitting the feedback message associated with the downlink message in the first uplink resource or the second uplink resource in accordance with the selecting.

By including or configuring the communications manager 820 in accordance with examples as described herein, the device 805 may support techniques that enable UEs 115 that are capable of half-duplex communications to nonetheless transmit HARQ feedback within SBFD slots. In particular, aspects of the present disclosure may enable SBFD-aware UEs 115 to identify whether conflicts exist between HARQ resources and resources of a SBFD communication frame structure in accordance with configured conflict conditions. As such, techniques described herein may enable UEs 115 to determine whether HARQ feedback may be transmitted using original HARQ resources of an SBFD slot, or whether the HARQ feedback is to be deferred to a future slot. In this regard, techniques described herein may reduce unnecessary deferrals of HARQ feedback, thereby reducing a latency of wireless communications and leading to a more efficient use of wireless resources.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for HARQ deferral in full-duplex as described herein, or the processor 840 and the memory 830 may be otherwise configured to perform or support such operations.

Figure 9:
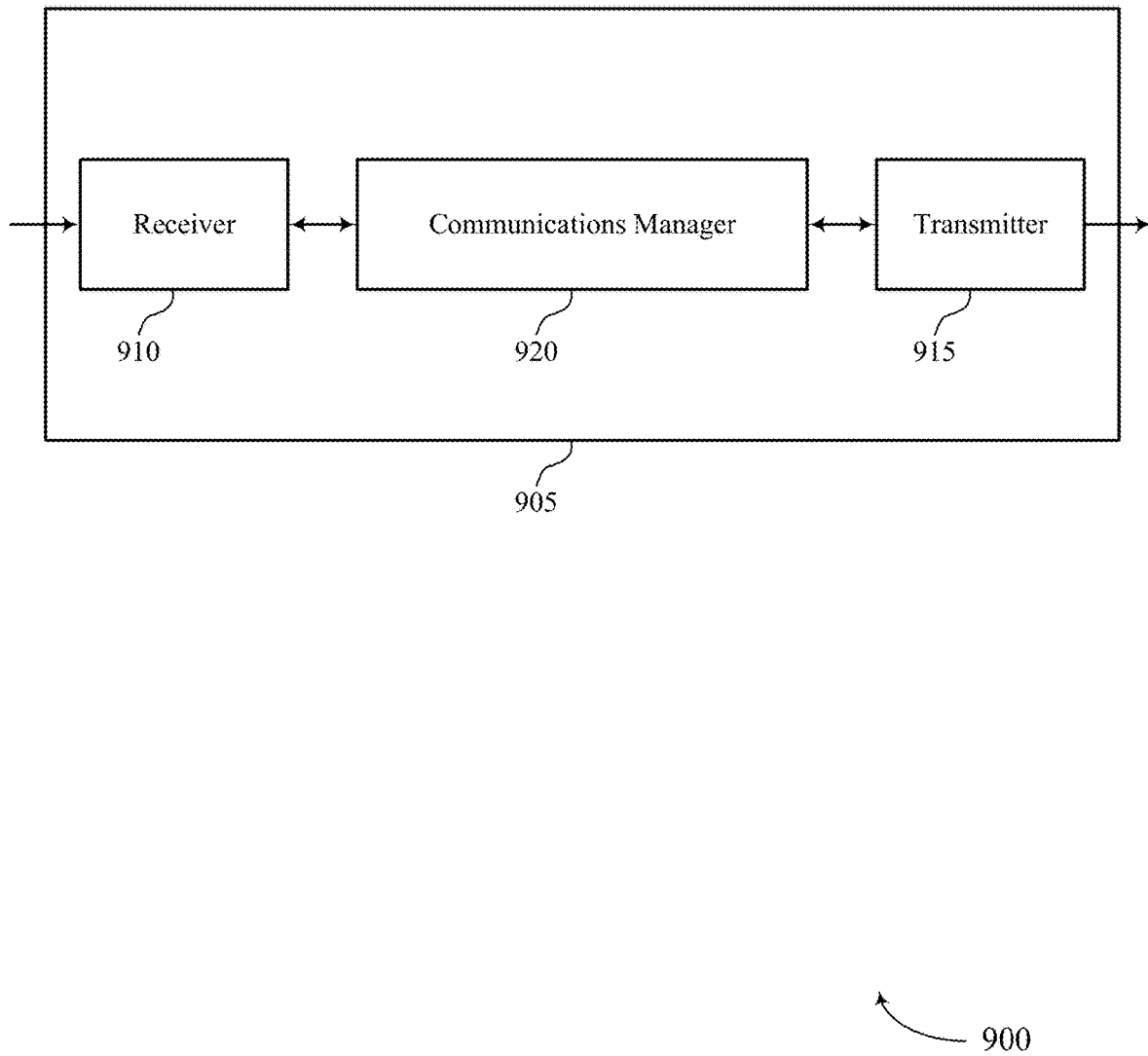
FIGS. 9 and 10 illustrate block diagrams of devices that support techniques for HARQ deferral in full-duplex in accordance with one or more aspects of the present disclosure.

FIG. 9 illustrates a block diagram 900 of a device 905 that supports techniques for HARQ deferral in full-duplex in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of techniques for HARQ deferral in full-duplex as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, a GPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software) executed by a processor. If implemented in code executed by a processor, the functions of the communications manager 920, the receiver 910, the transmitter 915, or various combinations or components thereof may be performed by a general-purpose processor, a DSP, a CPU, a GPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. For example, the communications manager 920 may be configured as or otherwise support a means for transmitting, to a UE, an indication of one or more conflict conditions for identification of conflicts between uplink feedback messages and a communication frame structure. The communications manager 920 may be configured as or otherwise support a means for transmitting a downlink message within a set of semi-persistent downlink resources. The communications manager 920 may be configured as or otherwise support a means for selecting between a first uplink resource and a second uplink resource for receiving a feedback message associated with the downlink message based on the one or more conflict conditions, where the selecting is based on the first uplink resource being included within an SBFD slot of the communication frame structure that includes one or more uplink subbands, and where the second uplink resource is subsequent to the first uplink resource. The communications manager 920 may be configured as or otherwise support a means for receiving the feedback message associated with the downlink message in the first uplink resource or the second uplink resource in accordance with the selecting.

By including or configuring the communications manager 920 in accordance with examples as described herein, the device 905 (e.g., a processor controlling or otherwise coupled with the receiver 910, the transmitter 915, the communications manager 920, or a combination thereof) may support techniques that enable UEs 115 that are capable of half-duplex communications to nonetheless transmit HARQ feedback within SBFD slots. In particular, aspects of the present disclosure may enable SBFD-aware UEs 115 to identify whether conflicts exist between HARQ resources and resources of a SBFD communication frame structure in accordance with configured conflict conditions. As such, techniques described herein may enable UEs 115 to determine whether HARQ feedback may be transmitted using original HARQ resources of an SBFD slot, or whether the HARQ feedback is to be deferred to a future slot. In this regard, techniques described herein may reduce unnecessary deferrals of HARQ feedback, thereby reducing a latency of wireless communications and leading to a more efficient use of wireless resources.

Figure 10:
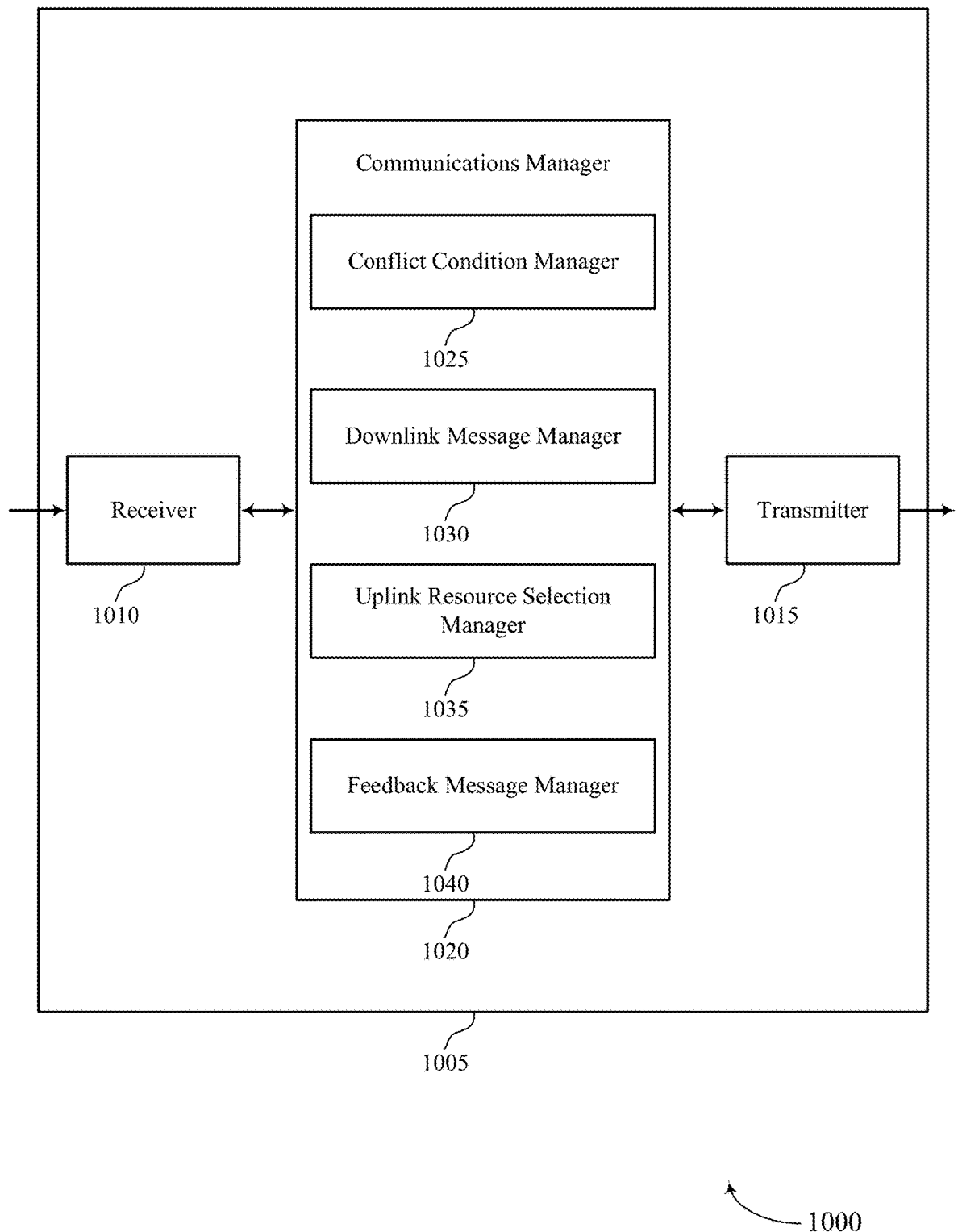

FIG. 10 illustrates a block diagram 1000 of a device 1005 that supports techniques for HARQ deferral in full-duplex in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of techniques for HARQ deferral in full-duplex as described herein. For example, the communications manager 1020 may include a conflict condition manager 1025, a downlink message manager 1030, an uplink resource selection manager 1035, a feedback message manager 1040, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a network entity in accordance with examples as disclosed herein. The conflict condition manager 1025 may be configured as or otherwise support a means for transmitting, to a UE, an indication of one or more conflict conditions for identification of conflicts between uplink feedback messages and a communication frame structure. The downlink message manager 1030 may be configured as or otherwise support a means for transmitting a downlink message within a set of semi-persistent downlink resources. The uplink resource selection manager 1035 may be configured as or otherwise support a means for selecting between a first uplink resource and a second uplink resource for receiving a feedback message associated with the downlink message based on the one or more conflict conditions, where the selecting is based on the first uplink resource being included within an SBFD slot of the communication frame structure that includes one or more uplink subbands, and where the second uplink resource is subsequent to the first uplink resource. The feedback message manager 1040 may be configured as or otherwise support a means for receiving the feedback message associated with the downlink message in the first uplink resource or the second uplink resource in accordance with the selecting.

Figure 11:
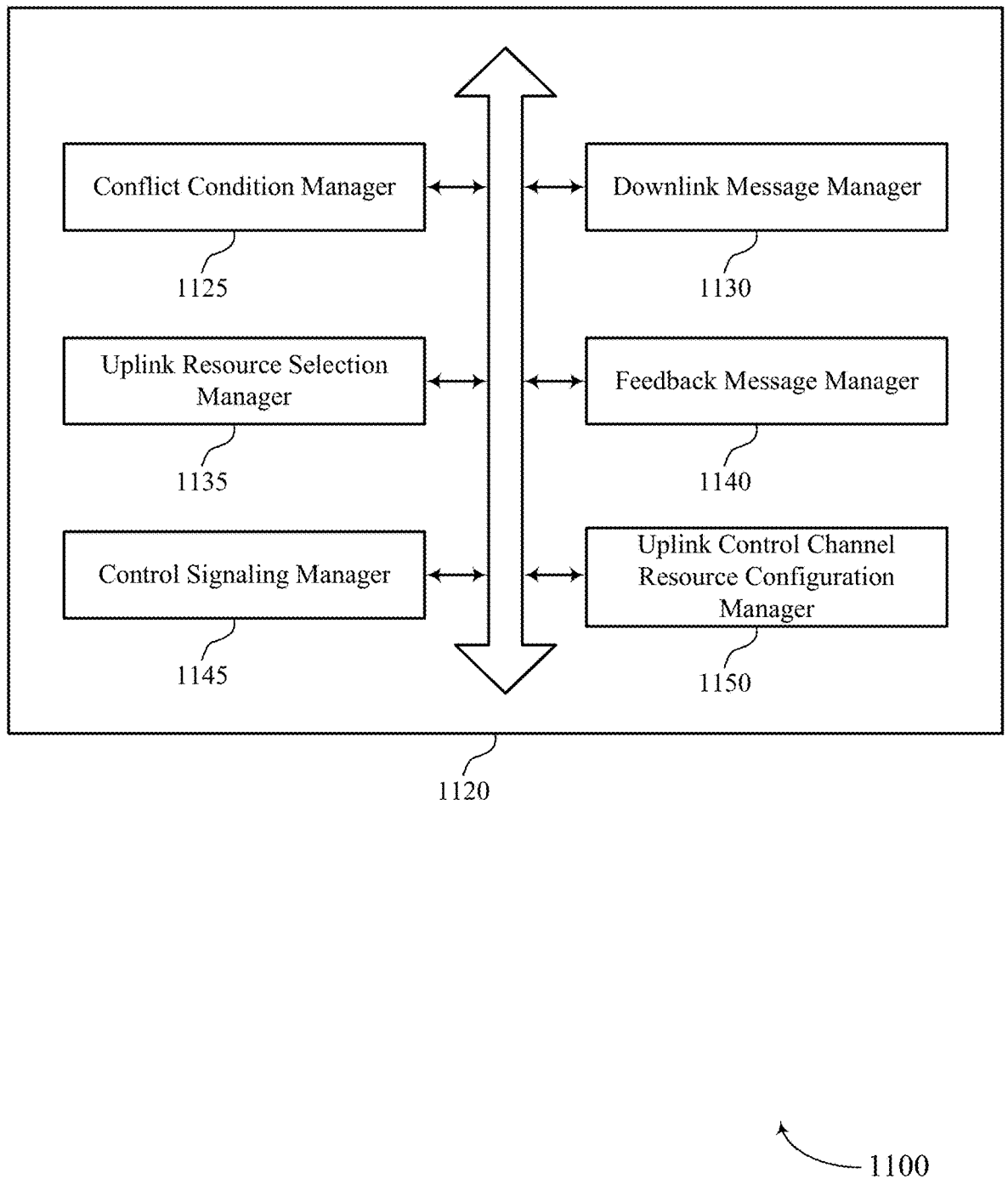
FIG. 11 illustrates a block diagram of a communications manager that supports techniques for HARQ deferral in full-duplex in accordance with one or more aspects of the present disclosure.

FIG. 11 illustrates a block diagram 1100 of a communications manager 1120 that supports techniques for HARQ deferral in full-duplex in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for HARQ deferral in full-duplex as described herein. For example, the communications manager 1120 may include a conflict condition manager 1125, a downlink message manager 1130, an uplink resource selection manager 1135, a feedback message manager 1140, a control signaling manager 1145, an uplink control channel resource configuration manager 1150, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a network entity in accordance with examples as disclosed herein. The conflict condition manager 1125 may be configured as or otherwise support a means for transmitting, to a UE, an indication of one or more conflict conditions for identification of conflicts between uplink feedback messages and a communication frame structure. The downlink message manager 1130 may be configured as or otherwise support a means for transmitting a downlink message within a set of semi-persistent downlink resources. The uplink resource selection manager 1135 may be configured as or otherwise support a means for selecting between a first uplink resource and a second uplink resource for receiving a feedback message associated with the downlink message based on the one or more conflict conditions, where the selecting is based on the first uplink resource being included within an SBFD slot of the communication frame structure that includes one or more uplink subbands, and where the second uplink resource is subsequent to the first uplink resource. The feedback message manager 1140 may be configured as or otherwise support a means for receiving the feedback message associated with the downlink message in the first uplink resource or the second uplink resource in accordance with the selecting.

In some examples, to support selecting, the uplink resource selection manager 1135 may be configured as or otherwise support a means for selecting the first uplink resource based on the first uplink resource being included within the one or more uplink subbands of the SBFD slot in a frequency domain, where the feedback message is received within the first uplink resource based on the selecting.

In some examples, to support selecting, the uplink resource selection manager 1135 may be configured as or otherwise support a means for selecting the second uplink resource based on a portion of the first uplink resource being located outside of the one or more uplink subbands of the SBFD slot in a frequency domain, where the feedback message is received within the second uplink resource based on the selecting.

In some examples, the control signaling manager 1145 may be configured as or otherwise support a means for transmitting control signaling indicating one or more candidate frequency offsets associated with the first uplink resource within the SBFD slot. In some examples, the uplink resource selection manager 1135 may be configured as or otherwise support a means for selecting the first uplink resource based on the first uplink resource being included within the one or more uplink subbands of the SBFD slot in a frequency domain using a frequency offset of the one or more candidate frequency offsets, where the feedback message is received within the first uplink resource based on the selecting and in accordance with the frequency offset of the one or more candidate frequency offsets.

In some examples, to support selecting, the uplink resource selection manager 1135 may be configured as or otherwise support a means for selecting the second uplink resource based on the first uplink resource at least partially overlapping in a time domain with an additional resource within the SBFD slot that is associated with an SSB, a CSS, or both, where the feedback message is received within the second uplink resource based on the selecting.

In some examples, to support selecting, the uplink resource selection manager 1135 may be configured as or otherwise support a means for selecting the first uplink resource based on the first uplink resource being included within the one or more uplink subbands of the SBFD slot in a frequency domain, and despite the first uplink resource at least partially overlapping in a time domain with an additional resource within the SBFD slot that is associated with an SSB, a CSS, or both, where the feedback message is received within the first uplink resource based on the selecting.

In some examples, the control signaling manager 1145 may be configured as or otherwise support a means for transmitting control signaling indicating a first priority associated with the feedback message and a second priority associated with the SSB, the CSS, or both, where the selecting is based on a comparison of the first priority and the second priority.

In some examples, to support selecting, the uplink resource selection manager 1135 may be configured as or otherwise support a means for selecting the second uplink resource based on a portion of the first uplink resource being located outside of the one or more uplink subbands of the SBFD slot in a frequency domain, and based on the first uplink resource at least partially overlapping in a time domain with an additional resource within the SBFD slot that is associated with an SSB, a CSS, or both, where the feedback message is received within the second uplink resource based on the selecting.

In some examples, the uplink control channel resource configuration manager 1150 may be configured as or otherwise support a means for transmitting control signaling indicating a first set of uplink control channel resource configurations associated with half-duplex slots, and a second set of uplink control channel resource configurations associated with SBFD slots, where selecting between the first uplink resource and the second uplink resource is based on the second uplink resource being associated with the first set of uplink control channel resource configurations.

In some examples, to support receiving the feedback message, the feedback message manager 1140 may be configured as or otherwise support a means for receiving the feedback message within the second uplink resource and in accordance with the first set of uplink control channel resource configurations based on the additional slot including a half-duplex slot, and receiving the feedback message within the second uplink resource and in accordance with the second set of uplink control channel resource configurations based on the additional slot including an SBFD slot.

In some examples, the control signaling manager 1145 may be configured as or otherwise support a means for transmitting an indication of a maximum deferral interval associated with deferral of feedback messages, where selecting the second uplink resource includes selecting the second uplink resource within the maximum deferral interval.

In some examples, to support selecting, the uplink resource selection manager 1135 may be configured as or otherwise support a means for selecting the second uplink resource based on the second uplink resource being included within a first uplink slot following the SBFD slot, a first flexible slot following the SBFD slot, or an additional SBFD slot including one or more additional uplink subbands following the SBFD slot.

In some examples, to support selecting, the uplink resource selection manager 1135 may be configured as or otherwise support a means for selecting the second uplink resource based on the first uplink slot, the first flexible slot, or the additional SBFD slot including a threshold quantity of uplink time and frequency resources to accommodate the second uplink resource.

In some examples, the UE is capable of performing half-duplex communications. In some examples, the UE includes an SBFD-aware UE.

Figure 12:
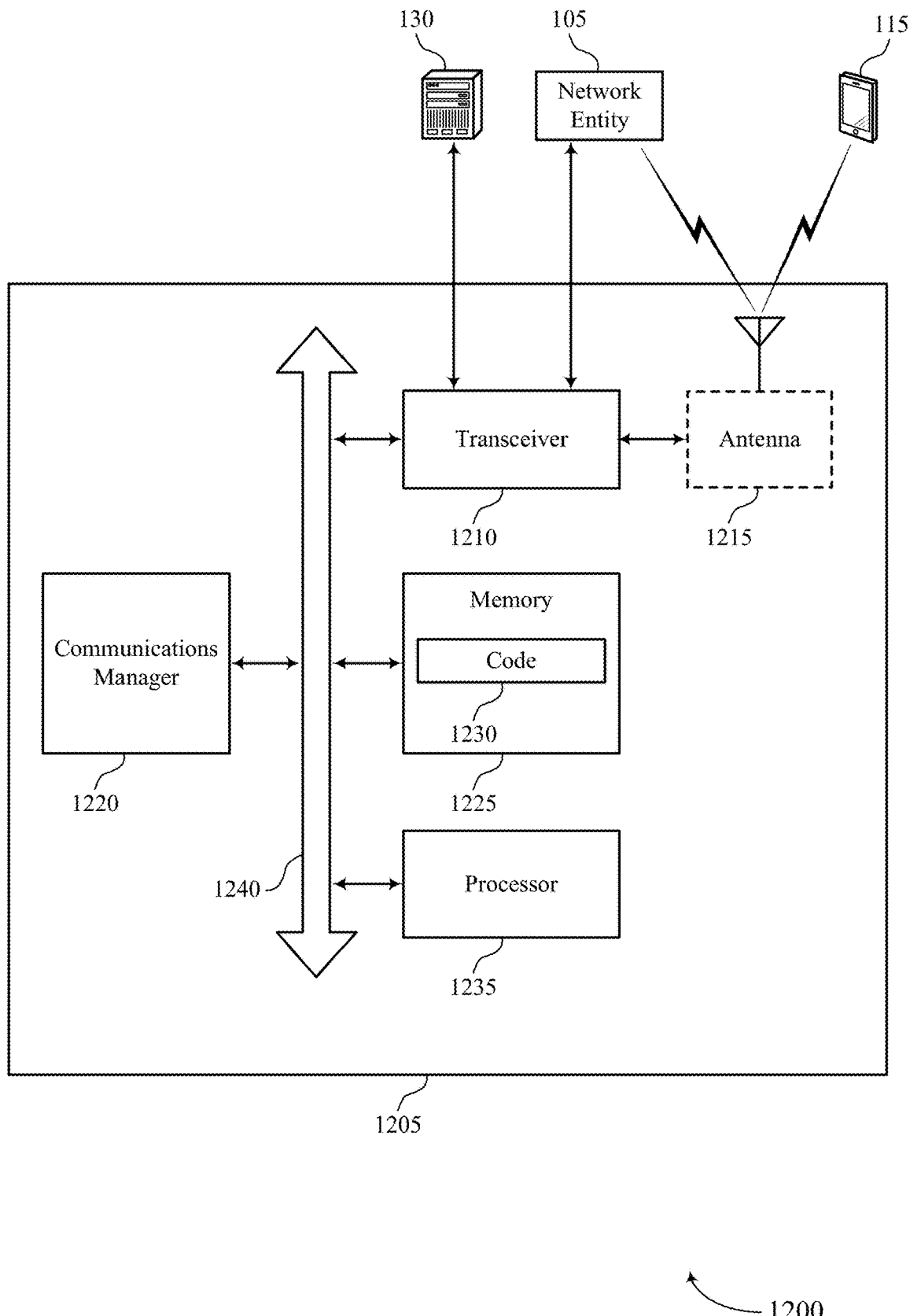
FIG. 12 illustrates a diagram of a system including a device that supports techniques for HARQ deferral in full-duplex in accordance with one or more aspects of the present disclosure.

FIG. 12 illustrates a diagram of a system 1200 including a device 1205 that supports techniques for HARQ deferral in full-duplex in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, a GPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting techniques for HARQ deferral in full-duplex). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication at a network entity in accordance with examples as disclosed herein. For example, the communications manager 1220 may be configured as or otherwise support a means for transmitting, to a UE, an indication of one or more conflict conditions for identification of conflicts between uplink feedback messages and a communication frame structure. The communications manager 1220 may be configured as or otherwise support a means for transmitting a downlink message within a set of semi-persistent downlink resources. The communications manager 1220 may be configured as or otherwise support a means for selecting between a first uplink resource and a second uplink resource for receiving a feedback message associated with the downlink message based on the one or more conflict conditions, where the selecting is based on the first uplink resource being included within an SBFD slot of the communication frame structure that includes one or more uplink subbands, and where the second uplink resource is subsequent to the first uplink resource. The communications manager 1220 may be configured as or otherwise support a means for receiving the feedback message associated with the downlink message in the first uplink resource or the second uplink resource in accordance with the selecting.

By including or configuring the communications manager 1220 in accordance with examples as described herein, the device 1205 may support techniques that enable UEs 115 that are capable of half-duplex communications to nonetheless transmit HARQ feedback within SBFD slots. In particular, aspects of the present disclosure may enable SBFD-aware UEs 115 to identify whether conflicts exist between HARQ resources and resources of a SBFD communication frame structure in accordance with configured conflict conditions. As such, techniques described herein may enable UEs 115 to determine whether HARQ feedback may be transmitted using original HARQ resources of an SBFD slot, or whether the HARQ feedback is to be deferred to a future slot. In this regard, techniques described herein may reduce unnecessary deferrals of HARQ feedback, thereby reducing a latency of wireless communications and leading to a more efficient use of wireless resources.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of techniques for HARQ deferral in full-duplex as described herein, or the processor 1235 and the memory 1225 may be otherwise configured to perform or support such operations.

Figure 13:
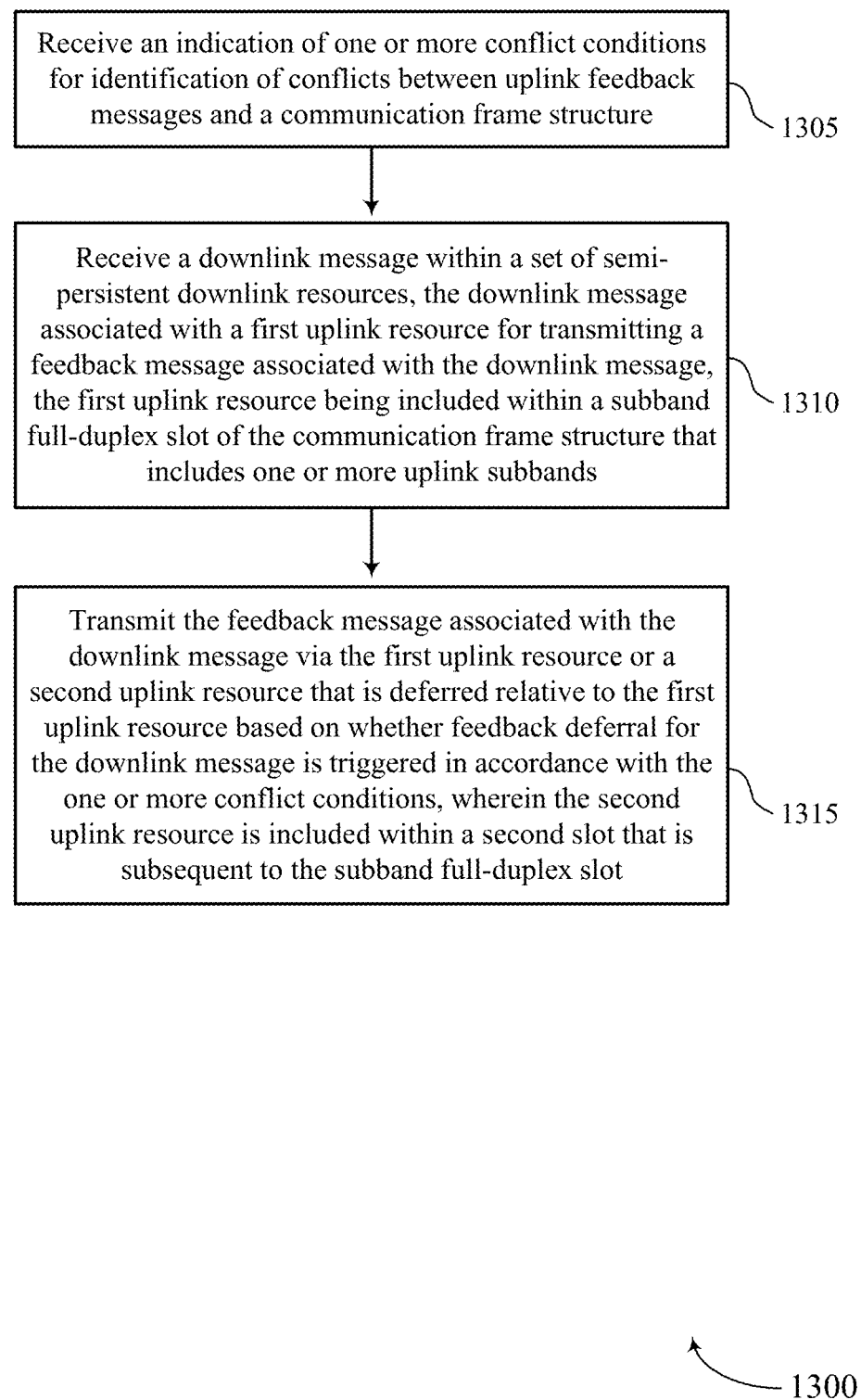
FIGS. 13 through 15 illustrate flowcharts showing methods that support techniques for HARQ deferral in full-duplex in accordance with one or more aspects of the present disclosure.

FIG. 13 illustrates a flowchart showing a method 1300 that supports techniques for HARQ deferral in full-duplex in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving an indication of one or more conflict conditions for identification of conflicts between uplink feedback messages and a communication frame structure. The operations of 1305 may be performed in accordance with examples as disclosed herein. In some examples, aspects of the operations of 1305 may be performed by a conflict condition manager 725 as described with reference to FIG. 7.

At 1310, the method may include receiving a downlink message within a set of semi-persistent downlink resources, the downlink message associated with a first uplink resource for transmitting a feedback message associated with the downlink message, the first uplink resource being included within an SBFD slot of the communication frame structure that includes one or more uplink subbands. The operations of 1310 may be performed in accordance with examples as disclosed herein. In some examples, aspects of the operations of 1310 may be performed by a downlink message manager 730 as described with reference to FIG. 7.

At 1315, the method may include transmitting the feedback message associated with the downlink message via the first uplink resource or a second uplink resource that is deferred relative to the first uplink resource based on whether feedback deferral for the downlink message is triggered in accordance with the one or more conflict conditions, wherein the second uplink resource is included within a second slot that is subsequent to the SBFD slot. The operations of 1315 may be performed in accordance with examples as disclosed herein. In some examples, aspects of the operations of 1315 may be performed by a feedback message manager 740 as described with reference to FIG. 7.

Figure 14:
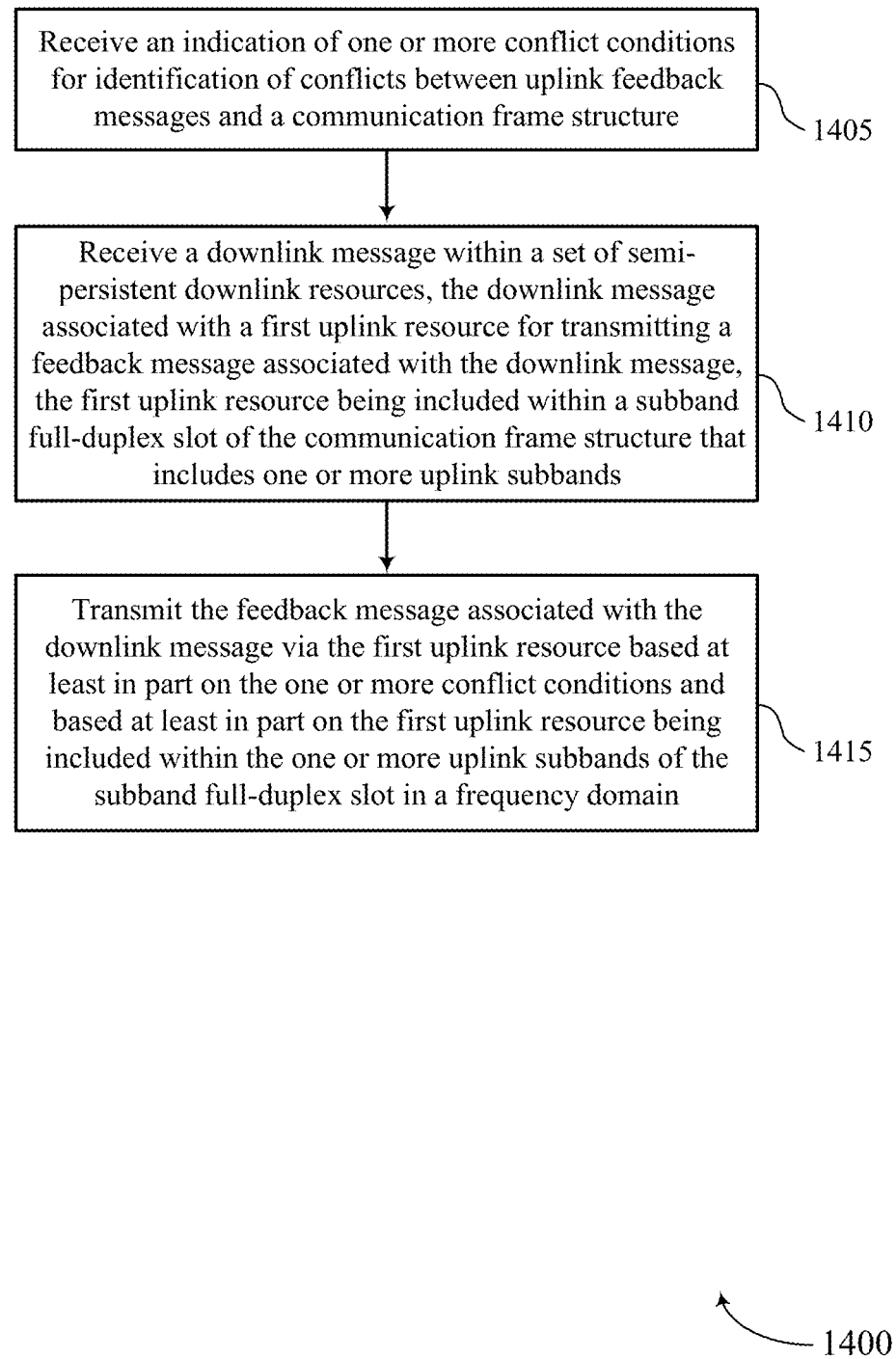

FIG. 14 illustrates a flowchart showing a method 1400 that supports techniques for HARQ deferral in full-duplex in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving an indication of one or more conflict conditions for identification of conflicts between uplink feedback messages and a communication frame structure. The operations of 1405 may be performed in accordance with examples as disclosed herein. In some examples, aspects of the operations of 1405 may be performed by a conflict condition manager 725 as described with reference to FIG. 7.

At 1410, the method may include receiving a downlink message within a set of semi-persistent downlink resources, the downlink message associated with a first uplink resource for transmitting a feedback message associated with the downlink message, the first uplink resource being included within an SBFD slot of the communication frame structure that includes one or more uplink subbands. The operations of 1410 may be performed in accordance with examples as disclosed herein. In some examples, aspects of the operations of 1410 may be performed by a downlink message manager 730 as described with reference to FIG. 7.

At 1415, the method may include transmitting the feedback message associated with the downlink message via the first uplink resource based at least in part on the one or more conflict conditions and based at least in part on the first uplink resource being included within the one or more uplink subbands of the SBFD slot in a frequency domain. The operations of 1415 may be performed in accordance with examples as disclosed herein. In some examples, aspects of the operations of 1415 may be performed by a feedback message manager 740 as described with reference to FIG. 7.

Figure 15:
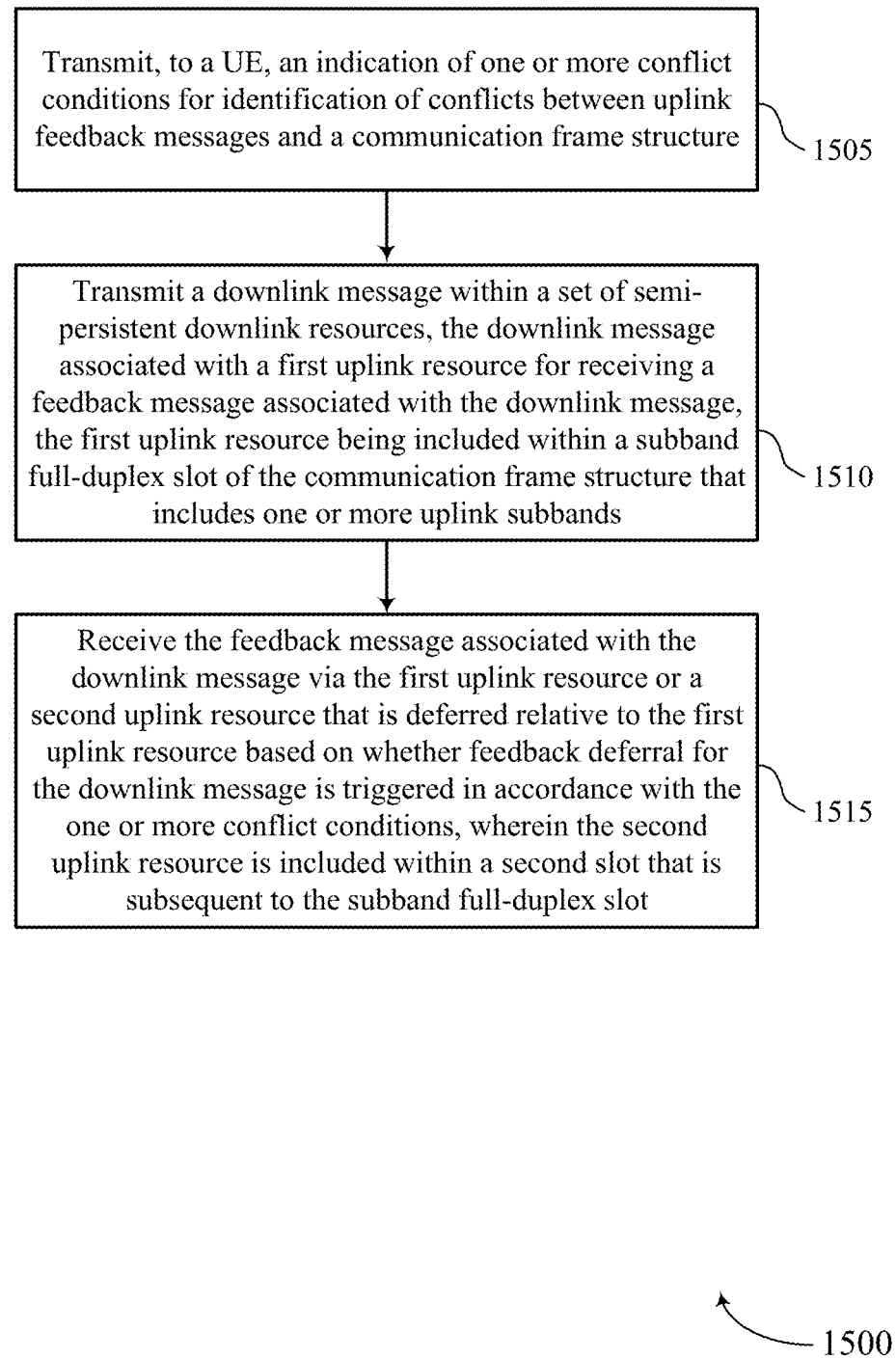

FIG. 15 illustrates a flowchart showing a method 1500 that supports techniques for HARQ deferral in full-duplex in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include transmitting, to a UE, an indication of one or more conflict conditions for identification of conflicts between uplink feedback messages and a communication frame structure. The operations of 1505 may be performed in accordance with examples as disclosed herein. In some examples, aspects of the operations of 1505 may be performed by a conflict condition manager 1125 as described with reference to FIG. 11.

At 1510, the method may include transmitting a downlink message within a set of semi-persistent downlink resources, the downlink message associated with a first uplink resource for receiving a feedback message associated with the downlink message, the first uplink resource being included within an SBFD slot of the communication frame structure that includes one or more uplink subbands. The operations of 1510 may be performed in accordance with examples as disclosed herein. In some examples, aspects of the operations of 1510 may be performed by a downlink message manager 1130 as described with reference to FIG. 11.

At 1515, the method may include receiving the feedback message associated with the downlink message via the first uplink resource or a second uplink resource that is deferred relative to the first uplink resource based on whether feedback deferral for the downlink message is triggered in accordance with the one or more conflict conditions, wherein the second uplink resource is included within a second slot that is subsequent to the SBFD slot. The operations of 1515 may be performed in accordance with examples as disclosed herein. In some examples, aspects of the operations of 1515 may be performed by a feedback message manager 1140 as described with reference to FIG. 11.

The following provides an overview of aspects of the present disclosure:

Aspect 1: A method for wireless communication at a UE, comprising: receiving an indication of one or more conflict conditions for identification of conflicts between uplink feedback messages and a communication frame structure; receiving a downlink message within a set of semi-persistent downlink resources, the downlink message associated with a first uplink resource for transmitting a feedback message associated with the downlink message, the first uplink resource being included within an SBFD slot of the communication frame structure that includes one or more uplink subbands; and transmitting the feedback message associated with the downlink message via the first uplink resource or a second uplink resource that is deferred relative to the first uplink resource based on whether feedback deferral for the downlink message is triggered in accordance with the one or more conflict conditions, wherein the second uplink resource is included within a second slot that is subsequent to the SBFD slot.

Aspect 2: The method of aspect 1, wherein transmitting the feedback message comprises: transmitting the feedback message via the first uplink resource based at least in part on the first uplink resource being included within the one or more uplink subbands of the SBFD slot in a frequency domain.

Aspect 3: The method of any of aspects 1 through 2, wherein transmitting the feedback message comprises: transmitting the feedback message via the second uplink resource based at least in part on a portion of the first uplink resource being located outside of the one or more uplink subbands of the SBFD slot in a frequency domain.

Aspect 4: The method of any of aspects 1 through 3, further comprising: receiving control signaling indicating one or more candidate frequency offsets associated with the first uplink resource within the SBFD slot; and transmitting the feedback message via the first uplink resource based at least in part on the first uplink resource being included within the one or more uplink subbands of the SBFD slot in a frequency domain using a frequency offset of the one or more candidate frequency offsets.

Aspect 5: The method of any of aspects 1 through 4, wherein transmitting the feedback message comprises: transmitting the feedback message via the second uplink resource based at least in part on the first uplink resource at least partially overlapping in a time domain with an additional resource within the SBFD slot that is associated with an SSB, a common search space, or both.

Aspect 6: The method of any of aspects 1 through 5, wherein transmitting the feedback message comprises: transmitting the feedback message via the first uplink resource based at least in part on the first uplink resource being included within the one or more uplink subbands of the SBFD slot in a frequency domain, and despite the first uplink resource at least partially overlapping in a time domain with an additional resource within the SBFD slot that is associated with an SSB, a common search space, or both.

Aspect 7: The method of aspect 6, further comprising: receiving control signaling indicating a first priority associated with the feedback message and a second priority associated with the SSB, the common search space, or both; and determining whether feedback deferral is triggered based at least in part on a comparison of the first priority and the second priority, wherein transmitting the feedback message is based at least in part on the determining.

Aspect 8: The method of any of aspects 1 through 7, wherein transmitting the feedback message comprises: transmitting the feedback message via the second uplink resource based at least in part on a portion of the first uplink resource being located outside of the one or more uplink subbands of the SBFD slot in a frequency domain, and based at least in part on the first uplink resource at least partially overlapping in a time domain with an additional resource within the SBFD slot that is associated with an SSB, a common search space, or both.

Aspect 9: The method of any of aspects 1 through 8, further comprising: receiving control signaling indicating a first set of uplink control channel resource configurations associated with half-duplex slots, and a second set of uplink control channel resource configurations associated with SBFD slots; and determining whether feedback deferral is triggered based at least in part on the first uplink resource being associated with the first set of uplink control channel resource configurations, wherein transmitting the feedback message is based at least in part on the determining.

Aspect 10: The method of aspect 9, wherein transmitting the feedback message comprises: transmitting the feedback message via the second uplink resource and in accordance with the first set of uplink control channel resource configurations based at least in part on the second slot comprising a half-duplex slot, and transmitting the feedback message via the second uplink resource and in accordance with the second set of uplink control channel resource configurations based at least in part on the second slot comprising an SBFD slot.

Aspect 11: The method of any of aspects 1 through 10, further comprising: receiving an indication of a maximum deferral interval associated with deferral of feedback messages, wherein the second slot including the second uplink resource is within the maximum deferral interval.

Aspect 12: The method of any of aspects 1 through 11, wherein transmitting the feedback message comprises: transmitting the feedback message via the second uplink resource based at least in part on the second slot including the second uplink resource comprising a first uplink slot following the SBFD slot, a first flexible slot following the SBFD slot, or an additional SBFD slot including one or more additional uplink subbands following the SBFD slot.

Aspect 13: The method of aspect 12, wherein transmitting the feedback message comprises: transmitting the feedback message via the second uplink resource based at least in part on the first uplink slot, the first flexible slot, or the additional SBFD slot including a threshold quantity of uplink time and frequency resources to accommodate the second uplink resource.

Aspect 14: The method of any of aspects 1 through 13, wherein the UE is capable of performing half-duplex communications, and the UE comprises an SBFD-aware UE.

Aspect 15: A method for wireless communication at a network entity, comprising: transmitting, to a UE, an indication of one or more conflict conditions for identification of conflicts between uplink feedback messages and a communication frame structure; transmitting a downlink message within a set of semi-persistent downlink resources, the downlink message associated with a first uplink resource for receiving a feedback message associated with the downlink message, the first uplink resource being included within an SBFD slot of the communication frame structure that includes one or more uplink subbands; and receiving the feedback message associated with the downlink message via the first uplink resource or a second uplink resource that is deferred relative to the first uplink resource based on whether feedback deferral for the downlink message is triggered in accordance with the one or more conflict conditions, wherein the second uplink resource is included within a second slot that is subsequent to the SBFD slot.

Aspect 16: The method of aspect 15, wherein receiving the feedback message comprises: receiving the feedback message via the first uplink resource based at least in part on the first uplink resource being included within the one or more uplink subbands of the SBFD slot in a frequency domain.

Aspect 17: The method of any of aspects 15 through 16, wherein receiving the feedback message comprises: receiving the feedback message via the second uplink resource based at least in part on a portion of the first uplink resource being located outside of the one or more uplink subbands of the SBFD slot in a frequency domain.

Aspect 18: The method of any of aspects 15 through 17, further comprising: transmitting control signaling indicating one or more candidate frequency offsets associated with the first uplink resource within the SBFD slot; and receiving the feedback message via the first uplink resource based at least in part on the first uplink resource being included within the one or more uplink subbands of the SBFD slot in a frequency domain using a frequency offset of the one or more candidate frequency offsets.

Aspect 19: The method of any of aspects 15 through 18, wherein receiving the feedback message comprises: receiving the feedback message via the second uplink resource based at least in part on the first uplink resource at least partially overlapping in a time domain with an additional resource within the SBFD slot that is associated with an SSB, a common search space, or both.

Aspect 20: The method of any of aspects 15 through 19, wherein receiving the feedback message comprises: receiving the feedback message via the first uplink resource based at least in part on the first uplink resource being included within the one or more uplink subbands of the SBFD slot in a frequency domain, and despite the first uplink resource at least partially overlapping in a time domain with an additional resource within the SBFD slot that is associated with an SSB, a common search space, or both.

Aspect 21: The method of aspect 20, further comprising: transmitting control signaling indicating a first priority associated with the feedback message and a second priority associated with the SSB, the common search space, or both; and determining whether feedback deferral is triggered based at least in part on a comparison of the first priority and the second priority, wherein receiving the feedback message is based at least in part on the determining.

Aspect 22: The method of any of aspects 15 through 21, wherein receiving the feedback message comprises: receiving the feedback message via the second uplink resource based at least in part on a portion of the first uplink resource being located outside of the one or more uplink subbands of the SBFD slot in a frequency domain, and based at least in part on the first uplink resource at least partially overlapping in a time domain with an additional resource within the SBFD slot that is associated with an SSB, a common search space, or both.

Aspect 23: The method of any of aspects 15 through 22, further comprising: transmitting control signaling indicating a first set of uplink control channel resource configurations associated with half-duplex slots, and a second set of uplink control channel resource configurations associated with SBFD slots; and determining whether feedback deferral is triggered based at least in part on the second uplink resource being associated with the first set of uplink control channel resource configurations, wherein receiving the feedback message is based at least in part on the determining.

Aspect 24: The method of aspect 23, wherein receiving the feedback message comprises: receiving the feedback message via the second uplink resource and in accordance with the first set of uplink control channel resource configurations based at least in part on the second slot comprising a half-duplex slot, and receiving the feedback message via the second uplink resource and in accordance with the second set of uplink control channel resource configurations based at least in part on the second slot comprising an SBFD slot.

Aspect 25: The method of any of aspects 15 through 24, further comprising: transmitting an indication of a maximum deferral interval associated with deferral of feedback messages, wherein the second slot including the second uplink resource is within the maximum deferral interval.

Aspect 26: The method of any of aspects 15 through 25, wherein receiving the feedback message comprises: receiving the feedback message via the second uplink resource based at least in part on the second slot including the second uplink resource comprising a first uplink slot following the SBFD slot, a first flexible slot following the SBFD slot, or an additional SBFD slot including one or more additional uplink subbands following the SBFD slot.

Aspect 27: The method of aspect 26, wherein receiving the feedback message comprises: receiving the feedback message via the second uplink resource based at least in part on the first uplink slot, the first flexible slot, or the additional SBFD slot including a threshold quantity of uplink time and frequency resources to accommodate the second uplink resource.

Aspect 28: The method of any of aspects 15 through 27, wherein the UE is capable of performing half-duplex communications, and the UE comprises an SBFD-aware UE.

Aspect 29: An apparatus for wireless communication at a UE, comprising a processor; memory coupled with the processor; and instructions stored in the memory and executable by the processor to cause the apparatus to perform a method of any of aspects 1 through 14.

Aspect 30: An apparatus for wireless communication at a UE, comprising at least one means for performing a method of any of aspects 1 through 14.

Aspect 31: A non-transitory computer-readable medium storing code for wireless communication at a UE, the code comprising instructions executable by a processor to perform a method of any of aspects 1 through 14.

Aspect 32: An apparatus for wireless communication at a network entity, comprising a processor; memory coupled with the processor; and instructions stored in the memory and executable by the processor to cause the apparatus to perform a method of any of aspects 15 through 28.

Aspect 33: An apparatus for wireless communication at a network entity, comprising at least one means for performing a method of any of aspects 15 through 28.

Aspect 34: A non-transitory computer-readable medium storing code for wireless communication at a network entity, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, code (e.g., software) executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., including a list of items prefaced by a phrase such as "at least one of" or "one or more of") indicates an inclusive list such that, for example, a list of at least one of A, B, or C means, e.g., A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" or "identify" or "identifying" encompasses a variety of actions and, therefore, "determining" or "identifying" can include calculating, computing, processing, deriving, investigating, looking up (such as via looking up in a table, a database or another data structure), ascertaining and the like. Also, "determining" or "identifying" can include receiving (such as receiving information or signaling, e.g., receiving information or signaling for determining, receiving information or signaling for identifying), accessing (such as accessing data in a memory, or accessing information) and the like. Also, "determining" or "identifying" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
    at least one processor; and
    memory coupled with the at least one processor, the memory storing instructions executable by the at least one processor to cause the UE to:
        receive an indication of one or more conflict conditions for identification of conflicts between uplink feedback messages and a communication frame structure;
        receive a downlink message within a set of semi-persistent downlink resources, the downlink message associated with a first uplink resource for transmitting a feedback message associated with the downlink message, the first uplink resource being included within a subband full-duplex slot of the communication frame structure that includes one or more uplink subbands; and
        transmit the feedback message associated with the downlink message via the first uplink resource or a second uplink resource that is deferred relative to the first uplink resource based on whether feedback deferral for the downlink message is triggered in accordance with the one or more conflict conditions, wherein the second uplink resource is included within a second slot that is subsequent to the subband full-duplex slot.

2. The apparatus of claim 1, wherein the instructions to transmit are executable by the at least one processor to cause the UE to:
    transmit the feedback message via the first uplink resource based at least in part on the first uplink resource being included within the one or more uplink subbands of the subband full-duplex slot in a frequency domain.

3. The apparatus of claim 1, wherein the instructions to transmit are executable by the at least one processor to cause the UE to:
    transmit the feedback message via the second uplink resource based at least in part on a portion of the first uplink resource being located outside of the one or more uplink subbands of the subband full-duplex slot in a frequency domain.

4. The apparatus of claim 1, wherein the instructions are further executable by the at least one processor to cause the UE to:
    receive control signaling indicating one or more candidate frequency offsets associated with the first uplink resource within the subband full-duplex slot; and
    transmit the feedback message via the first uplink resource based at least in part on the first uplink resource being included within the one or more uplink subbands of the subband full-duplex slot in a frequency domain using a frequency offset of the one or more candidate frequency offsets.

5. The apparatus of claim 1, wherein the instructions to transmit are executable by the at least one processor to cause the UE to:
    transmit the feedback message via the second uplink resource based at least in part on the first uplink resource at least partially overlapping in a time domain with an additional resource within the subband full-duplex slot that is associated with a synchronization signal block, a common search space, or both.

6. The apparatus of claim 1, wherein the instructions to transmit are executable by the at least one processor to cause the UE to:
    transmit the feedback message via the first uplink resource based at least in part on the first uplink resource being included within the one or more uplink subbands of the subband full-duplex slot in a frequency domain, and despite the first uplink resource at least partially overlapping in a time domain with an additional resource within the subband full-duplex slot that is associated with a synchronization signal block, a common search space, or both.

7. The apparatus of claim 6, wherein the instructions are further executable by the at least one processor to cause the UE to:
    receive control signaling indicating a first priority associated with the feedback message and a second priority associated with the synchronization signal block, the common search space, or both; and
    determine whether feedback deferral is triggered based at least in part on a comparison of the first priority and the second priority, wherein transmitting the feedback message is based at least in part on the determining.

8. The apparatus of claim 1, wherein the instructions to transmit are executable by the at least one processor to cause the UE to:
    transmit the feedback message via the second uplink resource based at least in part on a portion of the first uplink resource being located outside of the one or more uplink subbands of the subband full-duplex slot in a frequency domain, and based at least in part on the first uplink resource at least partially overlapping in a time domain with an additional resource within the subband full-duplex slot that is associated with a synchronization signal block, a common search space, or both.

9. The apparatus of claim 1, wherein the instructions are further executable by the at least one processor to cause the UE to:
    receive control signaling indicating a first set of uplink control channel resource configurations associated with half-duplex slots, and a second set of uplink control channel resource configurations associated with subband full-duplex slots; and determine whether feedback deferral is triggered based at least in part on the first uplink resource being associated with the first set of uplink control channel resource configurations, wherein transmitting the feedback message is based at least in part on the determining.

10. The apparatus of claim 9, the instructions to transmit the feedback message are executable by the at least one processor to cause the UE to:

transmit the feedback message via the second uplink resource and in accordance with the first set of uplink control channel resource configurations based at least in part on the second slot comprising a half-duplex slot, and transmitting the feedback message via the second uplink resource and in accordance with the second set of uplink control channel resource configurations based at least in part on the second slot comprising a subband full-duplex slot.

11. The apparatus of claim 1, wherein the instructions are further executable by the at least one processor to cause the UE to:

receive an indication of a maximum deferral interval associated with deferral of feedback messages, wherein the second slot including the second uplink resource is within the maximum deferral interval.

12. The apparatus of claim 1, wherein the instructions to transmit are executable by the at least one processor to cause the UE to:

transmit the feedback message via the second uplink resource based at least in part on the second slot including the second uplink resource comprising a first uplink slot following the subband full-duplex slot, a first flexible slot following the subband full-duplex slot, or an additional subband full-duplex slot including one or more additional uplink subbands following the subband full-duplex slot.

13. The apparatus of claim 12, wherein the instructions to transmit are executable by the at least one processor to cause the UE to:

transmit the feedback message via the second uplink resource based at least in part on the first uplink slot, the first flexible slot, or the additional subband full-duplex slot including a threshold quantity of uplink time and frequency resources to accommodate the second uplink resource.

14. The apparatus of claim 1, wherein the UE is capable of performing half-duplex communications, and wherein the UE comprises a subband full-duplex-aware UE.

15. An apparatus for wireless communication at a network entity, comprising:

at least one processor; and memory coupled with the at least one processor, the memory storing instructions executable by the at least one processor to cause the network entity to:

transmit, to a user equipment (UE), an indication of one or more conflict conditions for identification of conflicts between uplink feedback messages and a communication frame structure;

transmit a downlink message within a set of semi-persistent downlink resources, the downlink message associated with a first uplink resource for receiving a feedback message associated with the downlink message, the first uplink resource being included within a subband full-duplex slot of the communication frame structure that includes one or more uplink subbands; and receive the feedback message associated with the downlink message via the first uplink resource or a second uplink resource that is deferred relative to the first uplink resource based on whether feedback deferral for the downlink message is triggered in accordance with the one or more conflict conditions, wherein the second uplink resource is included within a second slot that is subsequent to the subband full-duplex slot.

16. The apparatus of claim 15, wherein the instructions to receive are executable by the at least one processor to cause the network entity to:

receive the feedback message via the first uplink resource based at least in part on the first uplink resource being included within the one or more uplink subbands of the subband full-duplex slot in a frequency domain.

17. The apparatus of claim 15, wherein the instructions to receive are executable by the at least one processor to cause the network entity to:

receive the feedback message via the second uplink resource based at least in part on a portion of the first uplink resource being located outside of the one or more uplink subbands of the subband full-duplex slot in a frequency domain.

18. The apparatus of claim 15, wherein the instructions are further executable by the at least one processor to cause the network entity to:

transmit control signaling indicating one or more candidate frequency offsets associated with the first uplink resource within the subband full-duplex slot; and receive the feedback message via the first uplink resource based at least in part on the first uplink resource being included within the one or more uplink subbands of the subband full-duplex slot in a frequency domain using a frequency offset of the one or more candidate frequency offsets.

19. The apparatus of claim 15, wherein the instructions to receive are executable by the at least one processor to cause the network entity to:

receive the feedback message via the second uplink resource based at least in part on the first uplink resource at least partially overlapping in a time domain with an additional resource within the subband full-duplex slot that is associated with a synchronization signal block, a common search space, or both.

20. The apparatus of claim 15, wherein the instructions to receive are executable by the at least one processor to cause the network entity to:

receive the feedback message via the first uplink resource based at least in part on the first uplink resource being included within the one or more uplink subbands of the subband full-duplex slot in a frequency domain, and despite the first uplink resource at least partially overlapping in a time domain with an additional resource within the subband full-duplex slot that is associated with a synchronization signal block, a common search space, or both.

21. The apparatus of claim 20, wherein the instructions are further executable by the at least one processor to cause the network entity to:

transmit control signaling indicating a first priority associated with the feedback message and a second priority associated with the synchronization signal block, the common search space, or both; and determine whether feedback deferral is triggered based at least in part on a comparison of the first priority and the second priority, wherein receiving the feedback message is based at least in part on the determining.

22. The apparatus of claim 15, wherein the instructions to receive are executable by the at least one processor to cause the network entity to:
receive the feedback message via the second uplink resource based at least in part on a portion of the first uplink resource being located outside of the one or more uplink subbands of the subband full-duplex slot in a frequency domain, and based at least in part on the first uplink resource at least partially overlapping in a time domain with an additional resource within the subband full-duplex slot that is associated with a synchronization signal block, a common search space, or both.

23. The apparatus of claim 15, wherein the instructions are further executable by the at least one processor to cause the network entity to:
transmit control signaling indicating a first set of uplink control channel resource configurations associated with half-duplex slots, and a second set of uplink control channel resource configurations associated with subband full-duplex slots; and
determine whether feedback deferral is triggered based at least in part on the second uplink resource being associated with the first set of uplink control channel resource configurations, wherein receiving the feedback message is based at least in part on the determining.

24. The apparatus of claim 23, wherein the instructions to receive the feedback message are executable by the at least one processor to cause the network entity to:
receive the feedback message via the second uplink resource and in accordance with the first set of uplink control channel resource configurations based at least in part on the second slot comprising a half-duplex slot, and receiving the feedback message via the second uplink resource and in accordance with the second set of uplink control channel resource configurations based at least in part on the second slot comprising a subband full-duplex slot.

25. The apparatus of claim 15, wherein the instructions are further executable by the at least one processor to cause the network entity to:
transmit an indication of a maximum deferral interval associated with deferral of feedback messages, wherein the second slot including the second uplink resource is within the maximum deferral interval.

26. The apparatus of claim 15, wherein the instructions to receive are executable by the at least one processor to cause the network entity to:
receive the feedback message via the second uplink resource based at least in part on the second slot including the second uplink resource comprising a first uplink slot following the subband full-duplex slot, a first flexible slot following the subband full-duplex slot, or an additional subband full-duplex slot including one or more additional uplink subbands following the subband full-duplex slot.

27. The apparatus of claim 26, wherein the instructions to receive are executable by the at least one processor to cause the network entity to:
receive the feedback message via the second uplink resource based at least in part on the first uplink slot, the first flexible slot, or the additional subband full-duplex slot including a threshold quantity of uplink time and frequency resources to accommodate the second uplink resource.

28. The apparatus of claim 15, wherein the UE is capable of performing half-duplex communications, and wherein the UE comprises a subband full-duplex-aware UE.

29. A method for wireless communication at a user equipment (UE), comprising:
receiving an indication of one or more conflict conditions for identification of conflicts between uplink feedback messages and a communication frame structure;
receiving a downlink message within a set of semi-persistent downlink resources, the downlink message associated with a first uplink resource for transmitting a feedback message associated with the downlink message, the first uplink resource being included within a subband full-duplex slot of the communication frame structure that includes one or more uplink subbands; and
transmitting the feedback message associated with the downlink message via the first uplink resource or a second uplink resource that is deferred relative to the first uplink resource based on whether feedback deferral for the downlink message is triggered in accordance with the one or more conflict conditions, wherein the second uplink resource is included within a second slot that is subsequent to the subband full-duplex slot.

30. A method for wireless communication at a network entity, comprising:
transmitting, to a user equipment (UE), an indication of one or more conflict conditions for identification of conflicts between uplink feedback messages and a communication frame structure;
transmitting a downlink message within a set of semi-persistent downlink resources, the downlink message associated with a first uplink resource for receiving a feedback message associated with the downlink message, the first uplink resource being included within a subband full-duplex slot of the communication frame structure that includes one or more uplink subbands; and
receiving the feedback message associated with the downlink message via the first uplink resource or a second uplink resource that is deferred relative to the first uplink resource based on whether feedback deferral for the downlink message is triggered in accordance with the one or more conflict conditions, wherein the second uplink resource is included within a second slot that is subsequent to the subband full-duplex slot.

* * * * *